(12) United States Patent
Shin et al.

(10) Patent No.: US 11,048,293 B2
(45) Date of Patent: Jun. 29, 2021

(54) ELECTRONIC DEVICE AND SYSTEM FOR DECIDING DURATION OF RECEIVING VOICE INPUT BASED ON CONTEXT INFORMATION

(71) Applicant: Samsung Electronics Co., Ltd., Suwon-si (KR)

(72) Inventors: Ho Seon Shin, Seoul (KR); Chui Min Lee, Seoul (KR); Seung Yeol Lee, Seoul (KR); Seong Min Je, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 221 days.

(21) Appl. No.: 16/040,165

(22) Filed: Jul. 19, 2018

(65) Prior Publication Data
US 2019/0025878 A1  Jan. 24, 2019

(30) Foreign Application Priority Data
Jul. 19, 2017 (KR) .................. 10-2017-0091274

(51) Int. Cl.
*G10L 15/18* (2013.01)
*G06F 1/16* (2006.01)
(Continued)

(52) U.S. Cl.
CPC .......... *G06F 1/1605* (2013.01); *G06F 3/0412* (2013.01); *G06F 3/0488* (2013.01);
(Continued)

(58) Field of Classification Search
CPC . G10L 15/22; G10L 2015/223; G10L 17/005; G10L 2015/228; G10L 2015/088;
(Continued)

(56) References Cited

U.S. PATENT DOCUMENTS 5,410,632 A    4/1995  Hong et al.
6,324,512 B1 * 11/2001  Junqua ............... H04N 5/44543
                                                    348/E5.105
(Continued)

FOREIGN PATENT DOCUMENTS

JP    2004-184715 A    7/2004
JP    10-2016-090681 A    5/2016
KR    10-2015-0138109 A    12/2015

OTHER PUBLICATIONS

Supplementary European Search Report dated Jun. 16, 2020 in connection with European Patent Application No. 18 83 4709, 17 pages.
(Continued)

*Primary Examiner* — Huyen X Vo

(57) ABSTRACT

An electronic device includes a speaker, a microphone, a communication circuit, a processor operatively connected to the speaker, the microphone, and the communication circuit, and a memory operatively connected to the processor. The memory stores instructions that, when executed, cause the processor to receive a user input to activate an intelligent system, to determine at least part of a duration to receive a user utterance via the microphone, based at least partly on a state of the electronic device, to receive a first user utterance via the microphone after receiving the user input, to transmit first data associated with the first user utterance to an external server via the communication circuit, and to receive a first response from the external server via the communication circuit. The first response is generated based at least partly on the first data.

20 Claims, 22 Drawing Sheets

(51) Int. Cl.
*H04R 27/00* (2006.01)
*G06F 3/041* (2006.01)
*G06F 3/0488* (2013.01)
*G06F 3/16* (2006.01)
*H04R 1/02* (2006.01)
*H04R 1/08* (2006.01)
*G06N 7/00* (2006.01)
*G06N 20/10* (2019.01)
*G06N 3/04* (2006.01)
*G06N 5/04* (2006.01)

(52) U.S. Cl.
CPC .............. *G06F 3/167* (2013.01); *G10L 15/18* (2013.01); *H04R 1/025* (2013.01); *H04R 1/083* (2013.01); *H04R 27/00* (2013.01); *G06N 3/04* (2013.01); *G06N 5/046* (2013.01); *G06N 7/005* (2013.01); *G06N 20/10* (2019.01); *H04R 2227/003* (2013.01)

(58) Field of Classification Search
CPC ......... G10L 25/51; G10L 15/08; G10L 15/24; G10L 15/28; G10L 15/285; G10L 15/30; G10L 15/32; G10L 17/04; G10L 17/22; G10L 2015/225; G10L 21/0272; G10L 15/063; G10L 17/06; G10L 25/78; G10L 15/02; G10L 15/18; G06F 1/1605; G06F 1/16; G06F 3/0412; G06F 3/041; G06F 3/0488; G06F 3/167; G06F 3/16; H04R 27/00; H04R 3/02; H04R 3/12; H04R 29/007; H04R 1/025; H04R 1/02; H04R 1/083; H04R 1/08; H04R 2227/003; G06N 7/005; G06N 7/00; G06N 20/10; G06N 3/04; G06N 5/046; G06N 5/04

See application file for complete search history.

(56) References Cited

U.S. PATENT DOCUMENTS

| | | | |
|---|---|---|---|
| 7,680,658 | B2 | 3/2010 | Chung et al. |
| 7,895,259 | B2* | 2/2011 | Amano ................ G06F 9/4843 709/201 |
| 9,159,320 | B2 | 10/2015 | Hyun et al. |
| 9,232,331 | B2 | 1/2016 | Priyantha et al. |
| 9,360,946 | B2 | 6/2016 | Priyantha et al. |
| 9,472,208 | B2 | 10/2016 | Sehlstedt |
| 9,715,875 | B2 | 7/2017 | Piernot et al. |
| 9,886,953 | B2 | 2/2018 | Lemay et al. |
| 9,997,174 | B2 | 6/2018 | Sehlstedt |
| 2002/0077830 | A1 | 6/2002 | Suomela et al. |
| 2004/0153321 | A1 | 8/2004 | Chung et al. |
| 2009/0327979 | A1* | 12/2009 | Haverinen ................ 715/864 |
| 2013/0024187 | A1 | 1/2013 | Chang et al. |
| 2013/0238335 | A1 | 9/2013 | Hyun et al. |
| 2014/0337015 | A1 | 11/2014 | Chang et al. |
| 2015/0243299 | A1 | 8/2015 | Sehlstedt |
| 2015/0326985 | A1 | 11/2015 | Priyantha et al. |
| 2015/0348548 | A1 | 12/2015 | Piernot et al. |
| 2016/0099906 | A1 | 4/2016 | Chang et al. |
| 2016/0116988 | A1 | 4/2016 | Priyantha et al. |
| 2016/0232893 | A1* | 8/2016 | Subhojit ................ G10L 17/22 |
| 2016/0260436 | A1 | 9/2016 | Lemay et al. |
| 2016/0343390 | A1 | 11/2016 | Sehlstedt |
| 2017/0017464 | A1* | 1/2017 | Roy ........................ G10L 15/22 |
| 2018/0012596 | A1 | 1/2018 | Piernot et al. |
| 2018/0130470 | A1 | 5/2018 | Lemay et al. |
| 2019/0013019 | A1* | 1/2019 | Lawrence ............... G10L 15/22 |

OTHER PUBLICATIONS

ISA/KR, "International Search Report and Written Opinion of the International Searching Authority," International Application No. PCT/KR2018/008189, dated Oct. 31, 2018, 11 pages.

* cited by examiner

ELECTRONIC DEVICE AND SYSTEM FOR DECIDING DURATION OF RECEIVING VOICE INPUT BASED ON CONTEXT INFORMATION

CROSS-REFERENCE TO RELATED APPLICATIONS AND CLAIM OF PRIORITY

This application is based on and claims priority under 35 U.S.C. § 119 to Korean Patent Application No. 10-2017-0091274, filed on Jul. 19, 2017, in the Korean Intellectual Property Office, the disclosure of which is incorporated by reference herein its entirety.

BACKGROUND

1. Field

The present disclosure relates to a technology for determining duration to receive a voice input based on context information.

2. Description of Related Art

In addition to a conventional input scheme using a keyboard or a mouse, electronic apparatuses have recently supported various input schemes such as a voice input and the like. For example, the electronic apparatuses such as a smartphone or a tablet PC may recognize the voice of a user input in a state where a speech recognition service is executed and may execute an action corresponding to a voice input or may provide the result found depending on the voice input.

Nowadays, the speech recognition service is being developed based on a technology processing a natural language. The technology processing the natural language refers to a technology that grasps the intent of the user utterance and provides the user with the result suitable for the intent.

The above information is presented as background information only to assist with an understanding of the present disclosure. No determination has been made, and no assertion is made, as to whether any of the above might be applicable as prior art with regard to the present disclosure.

SUMMARY

The user terminal needs to use a microphone to receive a voice input and may consume the power according to the usage of the microphone. When deactivating the microphone too early to reduce power consumption, the user terminal may miss the latter part of the voice signal. Alternatively, when the deactivation of the microphone is delayed, the power may be unnecessarily consumed.

Aspects of the present disclosure are to address at least the above-mentioned problems and/or disadvantages and to provide at least the advantages described below. Accordingly, an aspect of the present disclosure is to effectively consume power by determining a time when the microphone is activated, based on the context of a user terminal.

In accordance with an aspect of the present disclosure, an electronic device may include a housing, a speaker positioned at a first portion of the housing, a microphone positioned at a second portion of the housing, a communication circuit positioned in or attached to the housing, a processor positioned in the housing and operatively connected to the speaker, the microphone, and the communication circuit, and a memory positioned in the housing and operatively connected to the processor. The memory may store instructions that, when executed, cause the processor to receive a user input to activate an intelligent system, to determine at least part of a duration to receive a user utterance via the microphone, based at least partly on a state of the electronic device, to receive a first user utterance via the microphone after receiving the user input, to transmit first data associated with the first user utterance to an external server via the communication circuit, and to receive a first response from the external server via the communication circuit. The first response may be generated based at least partly on the first data.

In accordance with another aspect of the present disclosure, an electronic device may include a housing, a speaker positioned at a first portion of the housing, a microphone positioned at a second portion of the housing, a communication circuit positioned in or attached to the housing, a processor positioned in the housing and operatively connected to the speaker, the microphone, and the communication circuit, and a memory positioned in the housing and operatively connected to the processor. The memory may store instructions that, when executed, cause the processor to receive a first user utterance via the microphone, to transmit first data associated with the first user utterance to an external server via the communication circuit, to receive information on a context of a second user utterance for obtaining a parameter necessary to perform the task, from the external server via the communication circuit, to determine at least part of a duration to receive the second user utterance based at least partly on at least one of a state of the electronic device, the first user utterance, or the context of the second user utterance; and to keep the microphone open such that the electronic device is in a state to receive an utterance via the microphone for the duration. The first user utterance may include a request for performing a task, at least partly using the electronic device and requiring one or more parameters for execution, and the first user utterance may not include all of the one or more parameters.

In accordance with another aspect of the present disclosure, a system may include at least one network interface, at least one processor operatively connected to the network interface, and at least one memory operatively connected to the processor. The memory may store a sequence of states of at least one external electronic device to perform at least one task. The memory may further store instructions that, when executed, cause the processor to receive first data associated with a first user utterance provided via an external electronic device including a microphone, to determine that a second user utterance from a user is needed to perform the task, to determine at least part of a duration to receive the second user utterance via the external electronic device, based at least partly on a state of the external electronic device, the first user utterance, and/or a context of the second user utterance, and to provide information on the at least part of the duration to the external electronic device such that the external electronic device is in a state to receive an utterance via the microphone for the duration. The first user utterance may include a request for performing a task, at least partly using the external electronic device.

According to various embodiments of the present disclosure, it is possible to reduce unnecessary power consumption by determining a time when the microphone is activated, depending on the context of a user terminal.

According to various embodiments of the present disclosure, it is possible to increase the reaction speed of a speech recognition service by adjusting an activation time of the microphone.

Besides, a variety of effects directly or indirectly understood through the present disclosure may be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
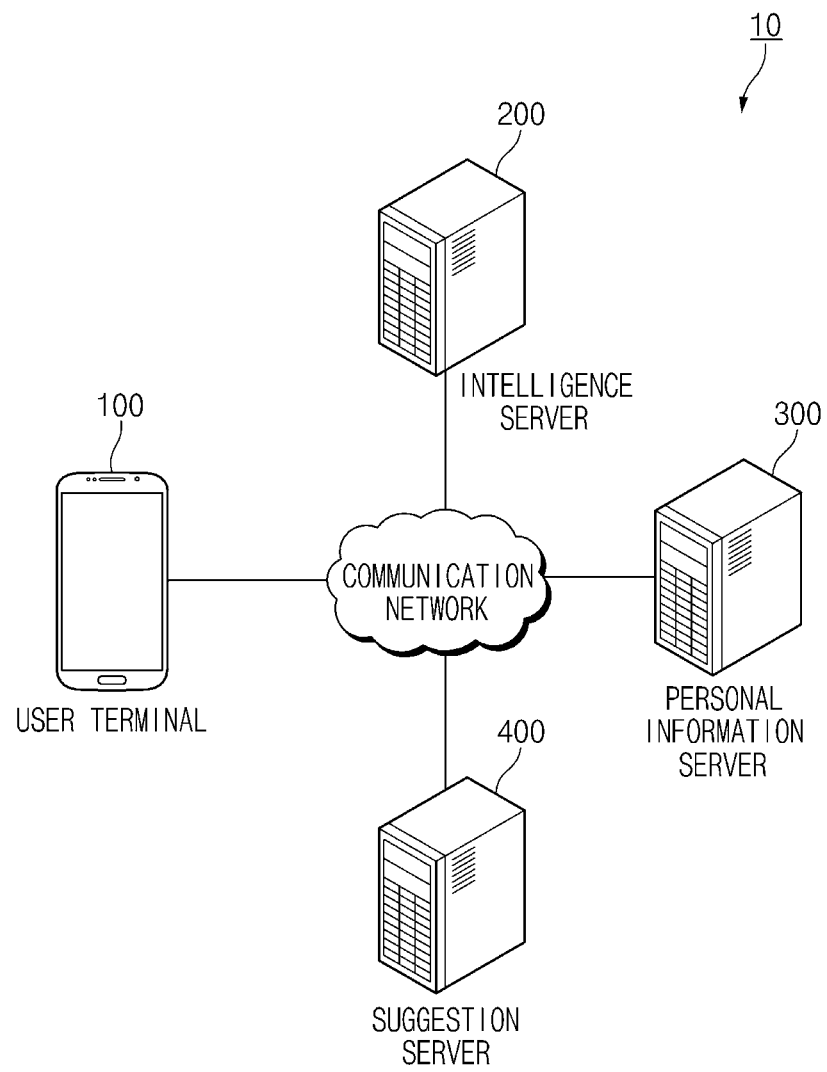
FIG. 1 illustrates an integrated intelligent system according to various embodiments of the present disclosure.

The terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the present disclosure will be described with reference to accompanying drawings. However, those of ordinary skill in the art will recognize that modification, equivalent, and/or alternative on the various embodiments described herein can be variously made without departing from the scope and spirit of the present disclosure.

Prior to describing an embodiment of the present disclosure, an integrated intelligent system to which an embodiment of the present disclosure is capable of being applied will be described.

FIG. 1 of the present disclosure an integrated intelligent system according to various embodiments of the present disclosure.

Referring to FIG. 1, an integrated intelligent system 10 may include a user terminal 100, an intelligent server 200, a personal information server 300, or a suggestion server 400.

The user terminal 100 may provide a service necessary for a user through an app (or an application program) (e.g., an alarm app, a message app, a picture (gallery) app, or the like) stored in the user terminal 100. For example, the user terminal 100 may execute and operate other app through an intelligent app (or a speech recognition app) stored in the user terminal 100. The user terminal 100 may execute the other app through the intelligent app and may receive a user input for executing an action. For example, the user input may be received through a physical button, a touch pad, a voice input, a remote input, or the like. According to an embodiment, various types of terminal devices (or an electronic device), which are connected with Internet, such as a mobile phone, a smartphone, personal digital assistant (PDA), a notebook computer, and the like may correspond to the user terminal 100.

According to an embodiment, the user terminal 100 may receive user utterance as a user input. The user terminal 100 may receive the user utterance and may generate a command for operating an app based on the user utterance. As such, the user terminal 100 may operate the app by using the command.

The intelligent server 200 may receive a voice input of a user from the user terminal 100 over a communication network and may convert the voice input to text data. In another embodiment, the intelligent server 200 may generate (or select) a path rule based on the text data. The path rule may include information about an action (or an operation) for performing the function of an app or information about a parameter necessary to perform the action. In addition, the path rule may include the order of the action of the app. The user terminal 100 may receive the path rule, may select an app depending on the path rule, and may execute the action included in the path rule in the selected app.

Generally, the term "path rule" of the present disclosure may mean, but not limited to, the sequence of states, which allows the electronic device to perform the task requested by the user. In other words, the path rule may include information about the sequence of the states. For example, the task may be a certain action that the intelligent app is capable of providing. The task may include the generation of a schedule, the transmission of a picture to a desired opponent, or the provision of weather information. The user terminal 100 may perform the task by sequentially having at least one or more states (e.g., an operating state of the user terminal 100).

According to an embodiment, the path rule may be provided or generated by an artificial intelligent (AI) system. The artificial intelligent system may be a rule-based system, or may be a neural network-based system (e.g., a feedforward neural network (FNN) or a recurrent neural network (RNN)). Alternatively, the artificial intelligent system may be a combination of the above-described systems or an artificial intelligent system different from the above-described system. According to an embodiment, the path rule may be selected from a set of predefined path rules or may be generated in real time in response to a user request. For example, the artificial intelligent system may select at least a path rule of predefined plurality of path rules, or may generate a path rule dynamically (or in real time). Furthermore, the user terminal 100 may use a hybrid system to provide the path rule.

According to an embodiment, the user terminal 100 may execute the action and may display a screen corresponding to a state of the user terminal 100, which executes the action, in a display. According to another embodiment, the user terminal 100 may execute the action and may not display the result obtained by executing the action in the display. For example, the user terminal 100 may execute a plurality of actions and may display only the result of a part of the plurality of actions in the display. For example, the user terminal 100 may display only the result, which is obtained by executing the last action, in the display. For another example, the user terminal 100 may receive the user input to display the result obtained by executing the action in the display.

The personal information server 300 may include a database in which user information is stored. For example, the personal information server 300 may receive the user information (e.g., context information, information about execution of an app, or the like) from the user terminal 100 and may store the user information in the database. The intelligent server 200 may be used to receive the user information from the personal information server 300 over the communication network and to generate a path rule associated with the user input. According to an embodiment, the user terminal 100 may receive the user information from the personal information server 300 over the communication network, and may use the user information as information for managing the database.

The suggestion server 400 may include a database storing information about a function in a terminal, introduction of an application, or a function to be provided. For example, the suggestion server 400 may include a database associated with a function that a user utilizes by receiving the user information of the user terminal 100 from the personal information server 300. The user terminal 100 may receive information about the function to be provided from the suggestion server 400 over the communication network and may provide the information to the user.

Figure 2:
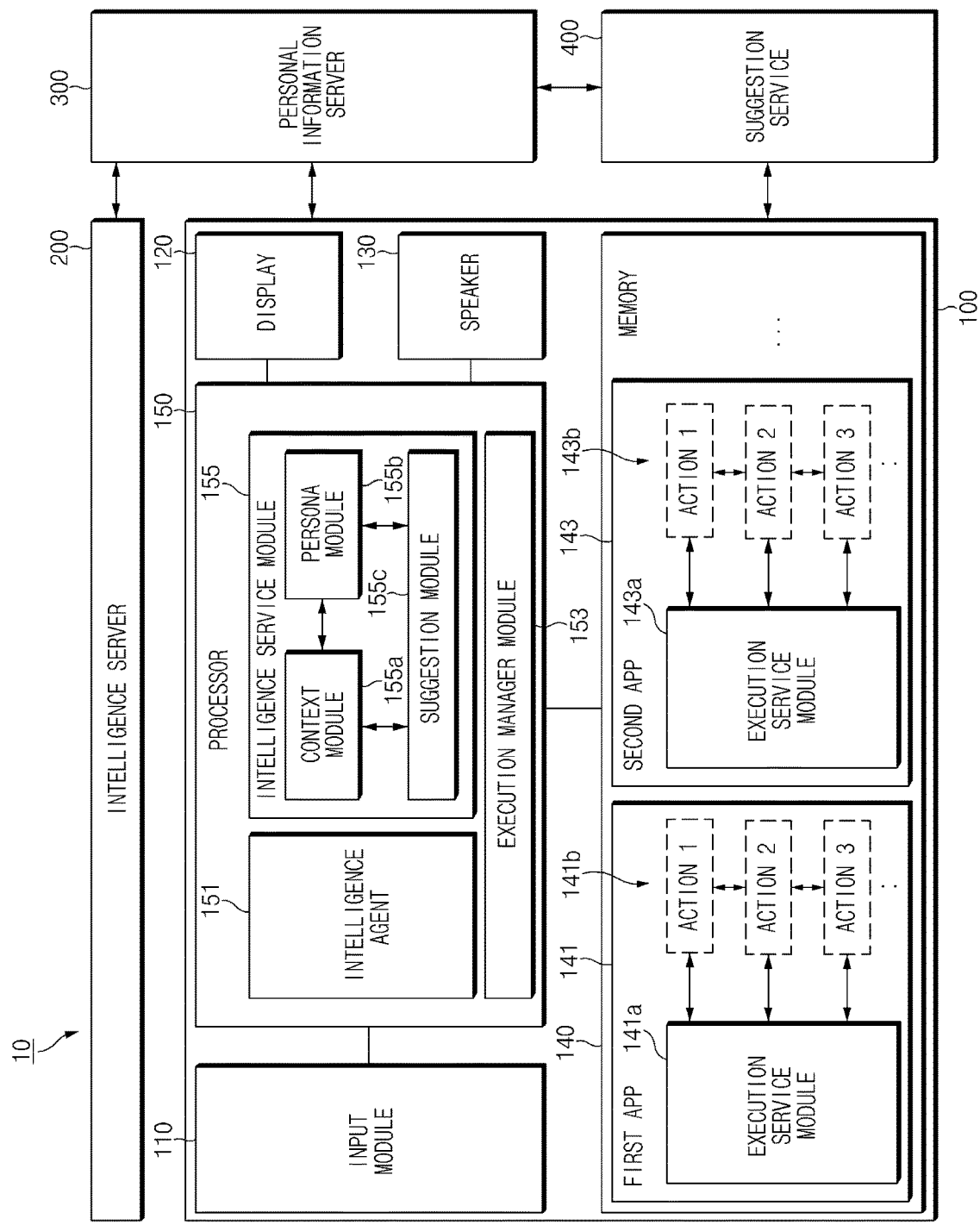
FIG. 2 illustrates a user terminal of an integrated intelligent system according to an embodiment of the present disclosure.

FIG. 2 illustrates a user terminal of an integrated intelligent system according to an embodiment of the present disclosure.

Referring to FIG. 2, the user terminal 100 may include an input module 110, a display 120, a speaker 130, a memory 140, or a processor 150. The user terminal 100 may further include a housing, and components of the user terminal 100 may be seated in the housing or may be positioned on the housing.

According to an embodiment, the input module 110 may receive a user input from a user. For example, the input module 110 may receive the user input from the connected external device (e.g., a keyboard or a headset). For another example, the input module 110 may include a touchscreen (e.g., a touchscreen display) coupled to the display 120. For another example, the input module 110 may include a hardware key (or a physical key) positioned in the user terminal 100 (or the housing of the user terminal 100).

According to an embodiment, the input module 110 may include a microphone that is capable of receiving the utterance of the user as a voice signal. For example, the input module 110 may include an utterance input system and may receive the utterance of the user as a voice signal through the utterance input system.

According to an embodiment, the display 120 may display an image, a video, and/or an execution screen of an application. For example, the display 120 may display a graphic user interface (GUI) of an app.

According to an embodiment, the speaker 130 may output the voice signal. For example, the speaker 130 may output the voice signal generated in the user terminal 100 to the outside.

According to an embodiment, the memory 140 may store a plurality of apps (or application program) 141 and 143. The plurality of apps 141 and 143 stored in the memory 140 may be selected, launched, and executed depending on the user input.

According to an embodiment, the memory 140 may include a database capable of storing information necessary to recognize the user input. For example, the memory 140 may include a log database capable of storing log information. For another example, the memory 140 may include a persona database capable of storing user information.

According to an embodiment, the memory 140 may store the plurality of apps 141 and 143, and the plurality of apps 141 and 143 may be loaded to operate. For example, the plurality of apps 141 and 143 stored in the memory 140 may be loaded by an execution manager circuit 153 of the processor 150 to operate. The plurality of apps 141 and 143 may include execution service modules 141a and 143a performing a function. In an embodiment, the plurality of apps 141 and 143 may perform a plurality of actions (e.g., a sequence of states) 141b and 143b through execution service modules 141a and 143a for the purpose of performing a function. That is, the execution service modules 141a and 143a may be activated by the execution manager module 153, and then may execute the plurality of actions 141b and 143b.

According to an embodiment, when the actions 141b and 143b of the apps 141 and 143 are executed, an execution state screen according to the execution of the actions 141b and 143b may be displayed in the display 120. For example, the execution state screen may be a screen in a state where the actions 141b and 143b are completed. For another example, the execution state screen may be a screen in a state where the execution of the actions 141b and 143b is in partial landing (e.g., in the case where a parameter necessary for the actions 141b and 143b are not entered).

According to an embodiment, the execution service modules 141a and 143a may execute the actions 141b and 143b depending on a path rule. For example, the execution service modules 141a and 143a may be activated by the execution manager module 153, may receive an execution request from the execution manager module 153 depending on the path rule, and may execute functions of the apps 141 and 143 by performing the actions 141b and 143b depending on the execution request. When the execution of the actions 141b and 143b is completed, the execution service modules 141a and 143a may transmit completion information to the execution manager module 153.

According to an embodiment, in the case where the plurality of the actions 141b and 143b are respectively executed in the apps 141 and 143, the plurality of the actions 141b and 143b may be sequentially executed. When the execution of one action (e.g., action 1 of the first app 141 or action 1 of the second app 143) is completed, the execution service modules 141a and 143a may open the next action (e.g., action 2 of the first app 141 or action 2 of the second app 143) and may transmit the completion information to the execution manager module 153. Here, it is understood that opening an arbitrary action is to change a state of the arbitrary action to an executable state or to prepare the execution of the action. In other words, when the arbitrary action is not opened, the corresponding action may be not executed. When the completion information is received, the execution manager module 153 may transmit the execution request associated with the next action (e.g., action 2 of the first app 141 or action 2 of the second app 143) to the execution service modules 141a and 143a. According to an embodiment, in the case where the plurality of apps 141 and 143 are executed, the plurality of apps 141 and 143 may be sequentially executed. For example, when receiving the completion information after the execution of the last action (e.g., action 3 of the first app 141) of the first app 141 is completed, the execution manager module 153 may transmit the execution request of the first action (e.g., action 1 of the second app 143) of the second app 143 to the execution service module 143a.

According to an embodiment, in the case where the plurality of the actions 141b and 143b are executed in the apps 141 and 143, a result screen according to the execution of each of the executed plurality of the actions 141b and 143b may be displayed in the display 120. According to an embodiment, only a part of a plurality of result screens according to the executed plurality of the actions 141b and 143b may be displayed in the display 120.

According to an embodiment, the memory 140 may store an intelligent app (e.g., a speech recognition app) operating in conjunction with an intelligent agent 151. The app operating in conjunction with the intelligent agent 151 may receive and process the utterance of the user as a voice signal. According to an embodiment, the app operating in conjunction with the intelligent agent 151 may be operated by a specific input (e.g., an input through a hardware key, an input through a touchscreen, or a specific voice input) input through the input module 110.

According to an embodiment, the processor 150 may control overall actions of the user terminal 100. For example, the processor 150 may control the input module 110 to receive the user input. The processor 150 may control the display 120 to display an image. The processor 150 may control the speaker 130 to output the voice signal. The processor 150 may control the memory 140 to read or store necessary information.

According to an embodiment, the processor 150 may include the intelligent agent 151, the execution manager module 153, or an intelligent service module 155. In an embodiment, the processor 150 may drive the intelligent agent 151, the execution manager module 153, or the intelligent service module 155 by executing instructions stored in the memory 140. Modules described in various embodiments of the present disclosure may be implemented by hardware or by software. In various embodiments of the present disclosure, it is understood that the action executed by the intelligent agent 151, the execution manager module 153, or the intelligent service module 155 is an action executed by the processor 150.

According to an embodiment, the intelligent agent 151 may generate a command for operating an app based on the voice signal received as the user input. According to an embodiment, the execution manager module 153 may receive the generated command from the intelligent agent 151, and may select, launch, and operate the apps 141 and 143 stored in the memory 140. According to an embodiment, the intelligent service module 155 may manage information of the user and may use the information of the user to process the user input.

The intelligent agent 151 may transmit and process the user input received through the input module 110 to the intelligent server 200.

According to an embodiment, before transmitting the user input to the intelligent server 200, the intelligent agent 151 may pre-process the user input. According to an embodiment, to pre-process the user input, the intelligent agent 151 may include an adaptive echo canceller (AEC) module, a noise suppression (NS) module, an end-point detection (EPD) module, or an automatic gain control (AGC) module. The AEC may remove an echo included in the user input. The NS module may suppress a background noise included in the user input. The EPD module may detect an end-point of a user voice included in the user input to search for a part in which the user voice is present. The AGC module may recognize the user input and may adjust the volume of the user input so as to be suitable to process the recognized user input. According to an embodiment, the intelligent agent 151 may include all the pre-processing components for performance. However, in another embodiment, the intelligent agent 151 may include a part of the pre-processing components to operate at low power.

According to an embodiment, the intelligent agent 151 may include a wakeup recognition module recognizing a call of a user. The wakeup recognition module may recognize a wake up command of the user through the speech recognition module. In the case where the wakeup recognition module receives the wake up command, the wakeup recognition module may activate the intelligent agent 151 to receive the user input. According to an embodiment, the wakeup recognition module of the intelligent agent 151 may be implemented with a low-power processor (e.g., a processor included in an audio codec). According to an embodiment, the intelligent agent 151 may be activated depending on the user input entered through a hardware key. In the case where the intelligent agent 151 is activated, an intelligent app (e.g., a speech recognition app) operating in conjunction with the intelligent agent 151 may be executed.

According to an embodiment, the intelligent agent 151 may include a speech recognition module for performing the user input. The speech recognition module may recognize the user input for executing an action in an app. For example, the speech recognition module may recognize a limited user (voice) input (e.g., utterance such as "click" for executing a capturing action when a camera app is being executed) for executing an action such as the wake up command in the apps 141 and 143. For example, the speech recognition module for recognizing a user input while assisting the intelligent server 200 may recognize and rapidly process a user command that can be processed in the user terminal 100. According to an embodiment, the speech recognition module for executing the user input of the intelligent agent 151 may be implemented in an app processor.

According to an embodiment, the speech recognition module (including the speech recognition module of a wake up module) of the intelligent agent 151 may recognize the user input by using an algorithm for recognizing a voice. For example, the algorithm for recognizing the voice may be at least one of a hidden Markov model (HMM) algorithm, an artificial neural network (ANN) algorithm, or a dynamic time warping (DTW) algorithm.

According to an embodiment, the intelligent agent 151 may change the voice input of the user to text data. According to an embodiment, the intelligent agent 151 may transmit the voice of the user to the intelligent server 200 to receive the changed text data. As such, the intelligent agent 151 may display the text data in the display 120.

According to an embodiment, the intelligent agent 151 may receive a path rule from the intelligent server 200. According to an embodiment, the intelligent agent 151 may transmit the path rule to the execution manager module 153.

According to an embodiment, the intelligent agent 151 may transmit the execution result log according to the path rule received from the intelligent server 200 to the intelligent service module 155, and the transmitted execution result log may be accumulated and managed in preference information of the user of a persona module 155b.

According to an embodiment, the execution manager module 153 may receive the path rule from the intelligent agent 151 to execute the apps 141 and 143 and may allow the apps 141 and 143 to execute the actions 141b and 143b included in the path rule. For example, the execution manager module 153 may transmit command information (e.g., information about a path rule) for executing the actions 141b and 143b to the apps 141 and 143 and may receive completion information of the actions 141b and 143b from the apps 141 and 143.

According to an embodiment, the execution manager module 153 may transmit and/or receive the command information (e.g., information about a path rule) for executing the actions 141b and 143b of the apps 141 and 143 between the intelligent agent 151 and the apps 141 and 143. The execution manager module 153 may bind the apps 141 and 143 to be executed depending on the path rule and may transmit the command information (e.g., information about a path rule) of the actions 141b and 143b included in the path rule to the apps 141 and 143. For example, the execution manager module 153 may sequentially transmit the actions 141b and 143b included in the path rule to the apps 141 and 143 and may sequentially execute the actions 141b and 143b of the apps 141 and 143 depending on the path rule.

According to an embodiment, the execution manager module 153 may manage execution states of the actions 141b and 143b of the apps 141 and 143. For example, the execution manager module 153 may receive information about the execution states of the actions 141b and 143b from the apps 141 and 143. For example, in the case where the execution states of the actions 141b and 143b are in partial landing (e.g., in the case where a parameter necessary for the actions 141b and 143b are not input), the execution manager module 153 may transmit information about the partial landing to the intelligent agent 151. The intelligent agent 151 may make a request for an input of necessary information (e.g., parameter information) to the user by using the received information. For another example, in the case where the execution states of the actions 141b and 143b are in an operating state, the utterance may be received from the user, and the execution manager module 153 may transmit information about the apps 141 and 143 being executed and the execution states of the apps 141 and 143 to the intelligent agent 151. The intelligent agent 151 may receive parameter information of the utterance of the user through the intelligent server 200 and may transmit the received parameter information to the execution manager module 153. The execution manager module 153 may change a parameter of each of the actions 141b and 143b to a new parameter by using the received parameter information.

According to an embodiment, the execution manager module 153 may transmit the parameter information included in the path rule to the apps 141 and 143. In the case where the plurality of apps 141 and 143 are sequentially executed depending on the path rule, the execution manager module 153 may transmit the parameter information included in the path rule from one app to another app.

According to an embodiment, the execution manager module 153 may receive a plurality of path rules. The execution manager module 153 may select a plurality of path rules based on the utterance of the user. For example, in the case where the user utterance specifies one app 141 executing one action 141b but does not specify the other app 143 executing the other action 143b, the execution manager module 153 may receive a plurality of different path rules, in which the same app 141 (e.g., gallery app) executing the one action 141b is executed and in which a different app 143 (e.g., message app or Telegram app) executing the other action 143b is executed. For example, the execution manager module 153 may execute the same actions 141b and 143b (e.g., the same successive actions 141b and 143b) of the plurality of path rules. In the case where the execution manager module 153 executes the same action, the execution manager module 153 may display a state screen for selecting the different apps 141 and 143 included in the plurality of path rules in the display 120.

According to an embodiment, the intelligent service module 155 may include a context module 155a, a persona module 155b, or a suggestion module 155c.

The context module 155a may collect current states of the apps 141 and 143 from the apps 141 and 143. For example, the context module 155a may receive context information indicating the current states of the apps 141 and 143 to collect the current states of the apps 141 and 143.

The persona module 155b may manage personal information of the user utilizing the user terminal 100. For example, the persona module 155b may collect the usage information and the execution result of the user terminal 100 to manage personal information of the user.

The suggestion module 155c may predict the intent of the user to recommend a command to the user. For example, the suggestion module 155c may recommend a command to the user in consideration of the current state (e.g., a time, a place, a situation, or an app) of the user.

Figure 3:
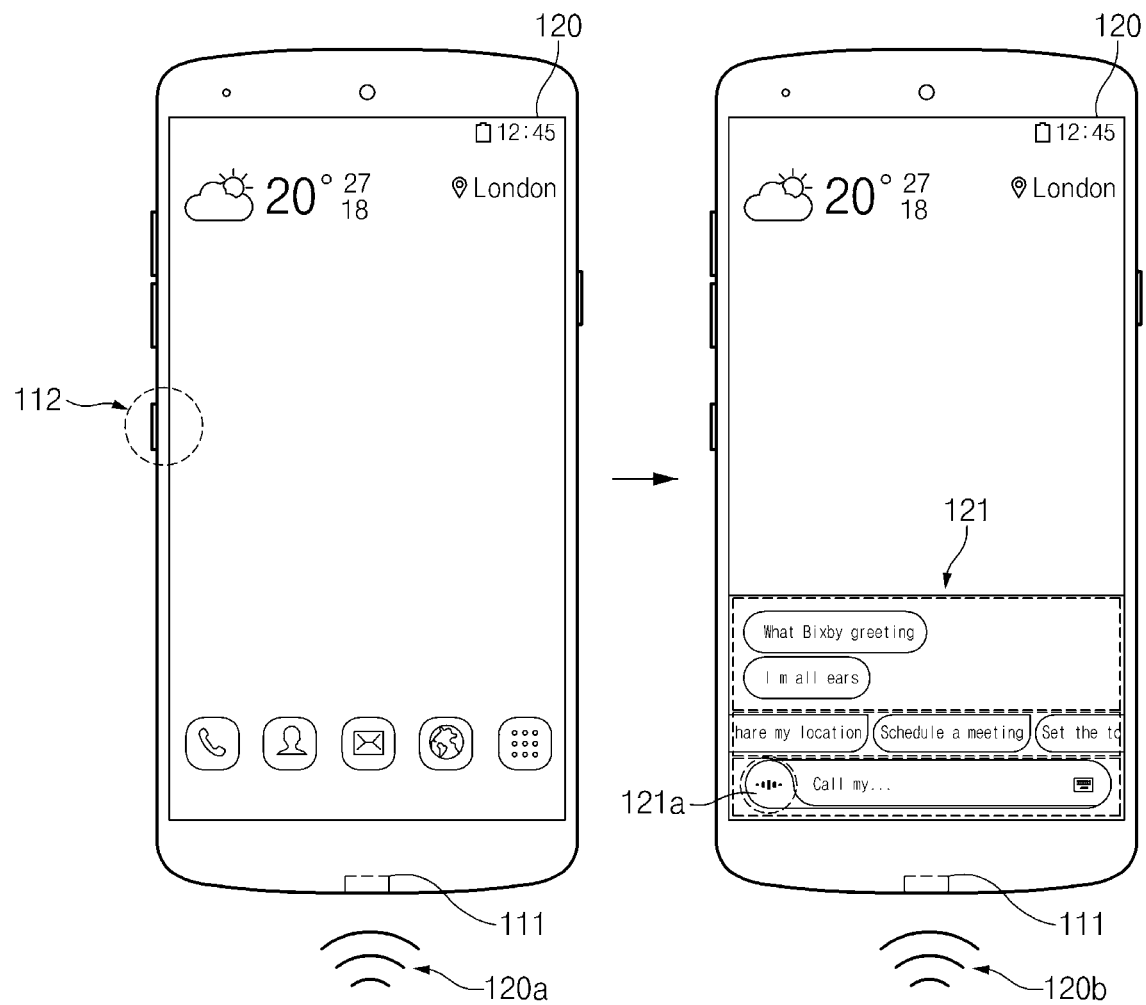
FIG. 3 illustrates that an intelligent app of a user terminal is executed according to an embodiment of the present disclosure.

FIG. 3 illustrates that an intelligent app of a user terminal is executed according to an embodiment of the present disclosure.

FIG. 3 illustrates that the user terminal 100 receives a user input to execute an intelligent app (e.g., a speech recognition app) operating in conjunction with the intelligent agent 151.

According to an embodiment, the user terminal 100 may execute the intelligent app for recognizing a voice through a hardware key 112. For example, in the case where the user terminal 100 receives the user input through the hardware key 112, the user terminal 100 may display a UI 121 of the intelligent app in the display 120. For example, a user may touch a speech recognition button 121a to the UI 121 of the intelligent app for the purpose of entering a voice 120b in a state where the UI 121 of the intelligent app is displayed in the display 120. For another example, while continuously pressing the hardware key 112 to enter the voice 120b, the user may enter the voice 120b.

According to an embodiment, the user terminal 100 may execute the intelligent app for recognizing a voice through a microphone 111. For example, in the case where a specified voice (e.g., wake up!) is entered 120a through the microphone 111, the user terminal 100 may display the UI 121 of the intelligent app in the display 120.

Figure 4:
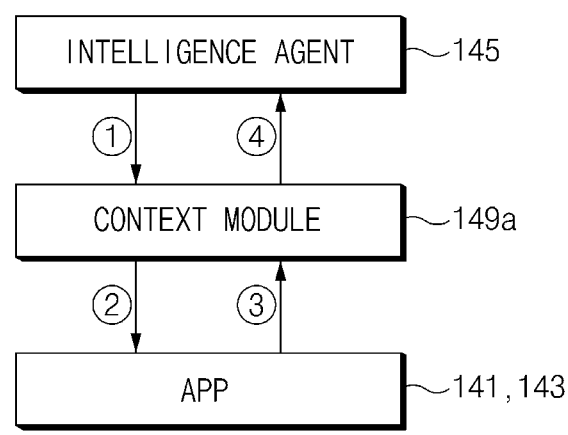
FIG. 4 illustrates that a context module of an intelligent service module collects a current state according to an embodiment of the present disclosure.

FIG. 4 illustrates that a context module of an intelligent service module collects a current state according to an embodiment of the present disclosure.

Referring to FIG. 4, if receiving a context request from the intelligent agent 151 ①, the context module 155a may make a request for context information indicating current states of the apps 141 and 143 to the apps 141 and 143 ②. According to an embodiment, the context module 155a may receive the context information from the apps 141 and 143 ③ and may transmit the context information to the intelligent agent 151 ④.

According to an embodiment, the context module 155a may receive pieces of context information through the apps 141 and 143. For example, the context information may be information about the most recently executed apps 141 and 143. For another example, the context information may be information (e.g., information about the corresponding picture in the case where a user watches a picture through a gallery app) about the current states in the apps 141 and 143.

According to an embodiment, the context module 155a may receive context information indicating a current state of the user terminal 100 from a device platform as well as the apps 141 and 143. The context information may include general context information, user context information, or device context information.

The general context information may include general information of the user terminal 100. The general context information may be verified through an internal algorithm by receiving data through a sensor hub of the device platform or the like. For example, the general context information may include information about current time and space. For example, the information about the current time and space may include information about current time or a current location of the user terminal 100. The current time may be verified through the time on the user terminal 100, and the information about the current location may be verified through a global positioning system (GPS). For another example, the general context information may include information about physical motion. For example, the information about the physical motion may include information about walking, running, driving, or the like. The information about the physical motion may be verified through a motion sensor. The information about the driving may be verified by sensing Bluetooth connection in a vehicle such that boarding and parking is verified as well as verifying the driving through the motion sensor. For another example, the general context information may include user activity information. For example, the user activity information may include information about commuting, shopping, travel, or the like. The user activity information may be verified by using information about a place where a user or an app registers in a database.

The user context information may include information about the user. For example, the user context information may include information about an emotional state of the user. For example, the information about the emotional state of the user may include information about happiness, sadness, anger, or the like of the user. For another example, the user context information may include information about the current state of the user. For example, the information about the current state of the user may include information about interest, intent, or the like (e.g., shopping).

The device context information may include information about the state of the user terminal 100. For example, the device context information may include information about a path rule that the execution manager module 153 performs. For another example, the device information may include information about a battery. For example, the information about the battery may be verified through charging and discharging states of the battery. For another example, the device information may include information about a connected device and a connected network. For example, the information about the connected device may be verified through a communication interface connected with the device.

Figure 5:
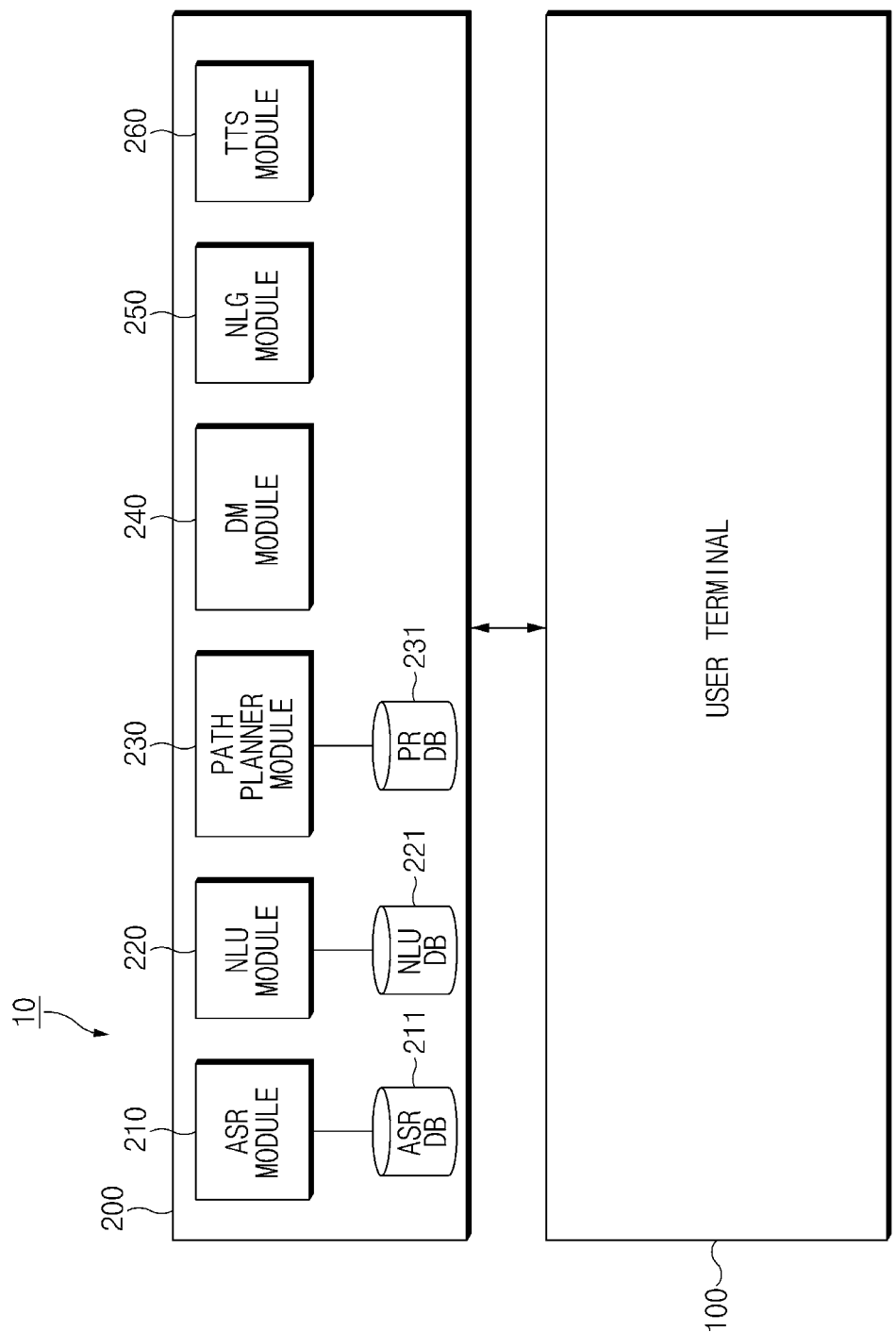
FIG. 5 illustrates an intelligent server of an integrated intelligent system according to an embodiment of the present disclosure.

FIG. 5 illustrates an intelligent server of an integrated intelligent system according to an embodiment of the present disclosure.

Referring to FIG. 5, the intelligent server 200 may include an automatic speech recognition (ASR) module 210, a natural language understanding (NLU) module 220, a path planner module 230, a dialogue manager (DM) module 240, a natural language generator (NLG) module 250, or a text to speech (TTS) module 260.

The NLU module 220 or the path planner module 230 of the intelligent server 200 may generate a path rule.

According to an embodiment, the ASR module 210 may change the user input received from the user terminal 100 to text data.

According to an embodiment, the ASR module 210 may convert the user input received from the user terminal 100 to text data. For example, the ASR module 210 may include a speech recognition module. The speech recognition module may include an acoustic model and a language model. For example, the acoustic model may include information associated with phonation, and the language model may include unit phoneme information and information about a combination of unit phoneme information. The speech recognition module may convert user speech to text data by using the information associated with phonation and unit phoneme information. For example, the information about the acoustic model and the language model may be stored in an automatic speech recognition database (ASR DB) 211.

According to an embodiment, the NLU module 220 may grasp user intent by performing syntactic analysis or semantic analysis. The syntactic analysis may divide the user input into syntactic units (e.g., words, phrases, morphemes, and the like) and determine which syntactic elements the divided units have. The semantic analysis may be performed by using semantic matching, rule matching, formula matching, or the like. As such, the NLU module 220 may obtain a domain, intent, or a parameter (or a slot) necessary to express the intent, from the user input.

According to an embodiment, the NLU module 220 may determine the intent of the user and parameter by using a matching rule that is divided into a domain, intent, and a parameter (or a slot) necessary to grasp the intent. For example, the one domain (e.g., an alarm) may include a plurality of intent (e.g., alarm settings, alarm cancellation, and the like), and one intent may include a plurality of parameters (e.g., a time, the number of iterations, an alarm sound, and the like). For example, the plurality of rules may include one or more necessary parameters. The matching rule may be stored in a natural language understanding database (NLU DB) 221.

According to an embodiment, the NLU module 220 may grasp the meaning of words extracted from a user input by using linguistic features (e.g., grammatical elements) such as morphemes, phrases, and the like and may match the meaning of the grasped words to the domain and intent to determine user intent. For example, the NLU module 220 may calculate how many words extracted from the user input is included in each of the domain and the intent, for the purpose of determining the user intent. According to an embodiment, the NLU module 220 may determine a parameter of the user input by using the words, which are based for grasping the intent. According to an embodiment, the NLU module 220 may determine the user intent by using the NLU DB 221 storing the linguistic features for grasping the intent of the user input. According to another embodiment, the NLU module 220 may determine the user intent by using a personal language model (PLM). For example, the NLU module 220 may determine the user intent by using the personalized information (e.g., a contact list or a music list). For example, the PLM may be stored in the NLU DB 221. According to an embodiment, the ASR module 210 as well as the NLU module 220 may recognize the voice of the user with reference to the PLM stored in the NLU DB 221.

According to an embodiment, the NLU module 220 may generate a path rule based on the intent of the user input and the parameter. For example, the NLU module 220 may select an app to be executed, based on the intent of the user input and may determine an action to be executed, in the selected app. The NLU module 220 may determine the parameter corresponding to the determined action to generate the path rule. According to an embodiment, the path rule generated by the NLU module 220 may include information about the app to be executed, the action (e.g., at least one or more states) to be executed in the app, and a parameter necessary to execute the action.

According to an embodiment, the NLU module 220 may generate one path rule, or a plurality of path rules based on the intent of the user input and the parameter. For example, the NLU module 220 may receive a path rule set corresponding to the user terminal 100 from the path planner module 230 and may map the intent of the user input and the parameter to the received path rule set to determine the path rule.

According to another embodiment, the NLU module 220 may determine the app to be executed, the action to be executed in the app, and a parameter necessary to execute the action based on the intent of the user input and the parameter for the purpose of generating one path rule or a plurality of path rules. For example, the NLU module 220 may arrange the app to be executed and the action to be executed in the app in the form of ontology or a graph model by using information of the user terminal 100 depending on the intent of the user input for the purpose of generating the path rule. For example, the generated path rule may be stored in a path rule database (PR DB) 231 through the path planner module 230. The generated path rule may be added to a path rule set of the PR DB 231.

According to an embodiment, the NLU module 220 may select at least one path rule of the generated plurality of path rules. For example, the NLU module 220 may select an optimal path rule of the plurality of path rules. For another example, in the case where only a part of action is specified based on the user utterance, the NLU module 220 may select a plurality of path rules. The NLU module 220 may determine one path rule of the plurality of path rules depending on an additional input of the user.

According to an embodiment, the NLU module 220 may transmit the path rule to the user terminal 100 in response to a request for the user input. For example, the NLU module 220 may transmit one path rule corresponding to the user input to the user terminal 100. For another example, the NLU module 220 may transmit the plurality of path rules corresponding to the user input to the user terminal 100. For example, in the case where only a part of action is specified based on the user utterance, the plurality of path rules may be generated by the NLU module 220.

According to an embodiment, the path planner module 230 may select at least one path rule of the plurality of path rules.

According to an embodiment, the path planner module 230 may transmit a path rule set including the plurality of path rules to the NLU module 220. The plurality of path rules of the path rule set may be stored in the PR DB 231 connected to the path planner module 230 in the table form. For example, the path planner module 230 may transmit a path rule set corresponding to information (e.g., OS information or app information) of the user terminal 100, which is received from the intelligent agent 151, to the NLU module 220. For example, a table stored in the PR DB 231 may be stored for each domain or for each version of the domain.

According to an embodiment, the path planner module 230 may select one path rule or the plurality of path rules from the path rule set to transmit the selected one path rule or the selected plurality of path rules to the NLU module 220. For example, the path planner module 230 may match the user intent and the parameter to the path rule set corresponding to the user terminal 100 to select one path rule or a plurality of path rules and may transmit the selected one path rule or the selected plurality of path rules to the NLU module 220.

According to an embodiment, the path planner module 230 may generate the one path rule or the plurality of path rules by using the user intent and the parameter. For example, the path planner module 230 may determine the app to be executed and the action to be executed in the app based on the user intent and the parameter for the purpose of generating the one path rule or the plurality of path rules. According to an embodiment, the path planner module 230 may store the generated path rule in the PR DB 231.

According to an embodiment, the path planner module 230 may store the path rule generated by the NLU module 220 in the PR DB 231. The generated path rule may be added to the path rule set stored in the PR DB 231.

According to an embodiment, the table stored in the PR DB 231 may include a plurality of path rules or a plurality of path rule sets. The plurality of path rules or the plurality of path rule sets may reflect the kind, version, type, or characteristic of a device performing each path rule.

According to an embodiment, the DM module 240 may determine whether the user intent grasped by the NLU module 220 is definite. For example, the DM module 240 may determine whether the user intent is clear, based on whether the information of a parameter is sufficient. The DM module 240 may determine whether the parameter grasped by the NLU module 220 is sufficient to perform a task. According to an embodiment, in the case where the user intent is not clear, the DM module 240 may perform a feedback for making a request for necessary information to the user. For example, the DM module 240 may perform a feedback for making a request for information about the parameter for grasping the user intent.

According to an embodiment, the DM module 240 may include a content provider module. In the case where the content provider module executes an action based on the intent and the parameter grasped by the NLU module 220, the content provider module may generate the result obtained by performing a task corresponding to the user input. According to an embodiment, the DM module 240 may transmit the result generated by the content provider module as the response to the user input to the user terminal 100.

According to an embodiment, the NLG module 250 may change specified information to a text form. Information changed to the text form may be a form of a natural language utterance. For example, the specified information may be information about an additional input, information for guiding the completion of an action corresponding to the user input, or information for guiding the additional input of the user (e.g., feedback information about the user input). The information changed to the text form may be displayed in the display 120 after being transmitted to the user terminal 100 or may be changed to a voice form after being transmitted to the TTS module 260.

According to an embodiment, the TTS module 260 may change information of the text form to information of a voice form. The TTS module 260 may receive the information of the text form from the NLG module 250, may change the information of the text form to the information of a voice form, and may transmit the information of the voice form to the user terminal 100. The user terminal 100 may output the information of the voice form to the speaker 130

According to an embodiment, the NLU module 220, the path planner module 230, and the DM module 240 may be implemented with one module. For example, the NLU module 220, the path planner module 230 and the DM module 240 may be implemented with one module, may determine the user intent and the parameter, and may generate a response (e.g., a path rule) corresponding to the determined user intent and parameter. As such, the generated response may be transmitted to the user terminal 100.

Figure 6:
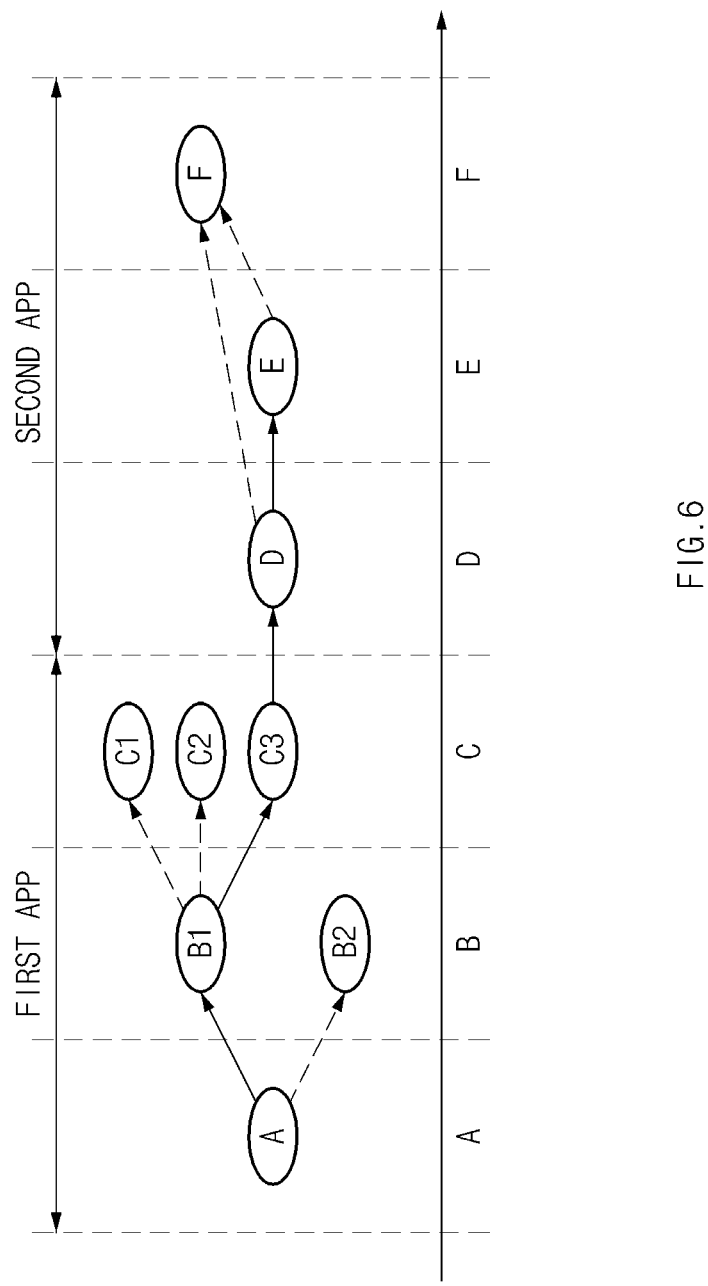
FIG. 6 illustrates a path rule generating method of a natural language understanding (NLU) module, according to an embodiment of the present disclosure.

FIG. 6 illustrates a path rule generating method of a path planner module according to an embodiment of the present disclosure.

Referring to FIG. 6, according to an embodiment, the NLU module 220 may divide the function of an app into any one action (e.g., state A to state F) and may store the divided unit actions in the PR DB 231. For example, the NLU module 220 may store a path rule set including a plurality of path rules A-B1-C1, A-B1-C2, A-B1-C3-D-F, and A-B1-C3-D-E-F, which are divided into actions (e.g., states), in the PR DB 231.

According to an embodiment, the PR DB 231 of the path planner module 230 may store the path rule set for performing the function of an app. The path rule set may include a plurality of path rules each of which includes a plurality of actions (e.g., a sequence of states). An action executed depending on a parameter input to each of the plurality of actions may be sequentially arranged in each of the plurality of path rules. According to an embodiment, the plurality of path rules implemented in a form of ontology or a graph model may be stored in the PR DB 231.

According to an embodiment, the NLU module 220 may select an optimal path rule A-B1-C3-D-F of the plurality of path rules A-B1-C1, A-B1-C2, A-B1-C3-D-F, and A-B1-C3-D-E-F corresponding to the intent of a user input and the parameter.

According to an embodiment, in the case where there is no path rule completely matched to the user input, the NLU module 220 may transmit a plurality of rules to the user terminal 100. For example, the NLU module 220 may select a path rule (e.g., A-B1) partly corresponding to the user input. The NLU module 220 may select one or more path rules (e.g., A-B1-C1, A-B1-C2, A-B1-C3-D-F, and A-B1-C3-D-E-F) including the path rule (e.g., A-B1) partly corresponding to the user input and may transmit the one or more path rules to the user terminal 100.

According to an embodiment, the NLU module 220 may select one of a plurality of path rules based on an input added by the user terminal 100 and may transmit the selected one path rule to the user terminal 100. For example, the NLU module 220 may select one path rule (e.g., A-B1-C3-D-F) of the plurality of path rules (e.g., A-B1-C1, A-B1-C2, A-B1-C3-D-F, and A-B1-C3-D-E-F) depending on the user input (e.g., an input for selecting C3) additionally entered by the user terminal 100 for the purpose of transmitting the selected one path rule to the user terminal 100.

According to another embodiment, the NLU module 220 may determine the intent of a user and the parameter corresponding to the user input (e.g., an input for selecting C3) additionally entered by the user terminal 100 for the purpose of transmitting the user intent or the parameter to the user terminal 100. The user terminal 100 may select one path rule (e.g., A-B1-C3-D-F) of the plurality of path rules (e.g., A-B1-C1, A-B1-C2, A-B1-C3-D-F, and A-B1-C3-D-E-F) based on the transmitted intent or the transmitted parameter.

As such, the user terminal 100 may complete the actions of the apps 141 and 143 based on the selected one path rule.

According to an embodiment, in the case where a user input in which information is insufficient is received by the intelligent server 200, the NLU module 220 may generate a path rule partly corresponding to the received user input. For example, the NLU module 220 may transmit the partly corresponding path rule to the intelligent agent 151. The intelligent agent 151 may transmit the partly corresponding path rule to the execution manager module 153, and the execution manager module 153 may execute the first app 141 depending on the path rule. The execution manager module 153 may transmit information about an insufficient parameter to the intelligent agent 151 while executing the first app 141. The intelligent agent 151 may make a request for an additional input to a user by using the information about the insufficient parameter. If the additional input is received by the user, the intelligent agent 151 may transmit and process the additional input to the intelligent server 200. The NLU module 220 may generate a path rule to be added, based on the intent of the user input additionally entered and parameter information additionally entered and may transmit the path rule to be added, to the intelligent agent 151. The intelligent agent 151 may transmit the path rule to the execution manager module 153 and may execute the second app 143.

According to an embodiment, in the case where a user input, in which a portion of information is missed, is received by the intelligent server 200, the NLU module 220 may transmit a user information request to the personal information server 300. The personal information server 300 may transmit information of a user entering the user input stored in a persona database to the NLU module 220. The NLU module 220 may select a path rule corresponding to the user input in which a part of an action is partly missed, by using the user information. As such, even though the user input in which a portion of information is missed is received by the intelligent server 200, the NLU module 220 may make a request for the missed information to receive an additional input or may determine a path rule corresponding to the user input by using user information.

According to an embodiment, Table 1 attached below may indicate an exemplary form of a path rule associated with a task that a user requests.

TABLE 1

| Path rule ID | State | Parameter |
|---|---|---|
| Gallery_101 | PictureView(25) | NULL |
| | SearchView(26) | NULL |
| | SearchViewResult(27) | Location, time |
| | SearchEmptySelectedView(28) | NULL |
| | SearchSelectedView(29) | ContentType, selectall |
| | CrossShare(30) | anaphora |

Referring to Table 1, a path rule that is generated or selected by an intelligent server (the intelligent server 200 of FIG. 1) depending on user speech (e.g., "please share a picture") may include at least one state 25, 26, 27, 28, 29 or 30. For example, the at least one state (e.g., one operating state of a terminal) may correspond to at least one of the picture application execution PicturesView 25, the picture search function execution SearchView 26, the search result display screen output SearchViewResult 27, the search result display screen output, in which a picture is non-selected, SearchEmptySelectedView 28, the search result display screen output, in which at least one picture is selected, SearchSelectedView 29, or the share application selection screen output CrossShare 30.

In an embodiment, parameter information of the path rule may correspond to at least one state. For example, the search result display screen output, in which at least one picture is selected, SearchSelectedView 29 may be included in the at least one state.

The task (e.g., "please share a picture!") that the user requests may be performed depending on the execution result of the path rule including the sequence of the states 25, 26, 27, 28, and 29.

Figure 7:
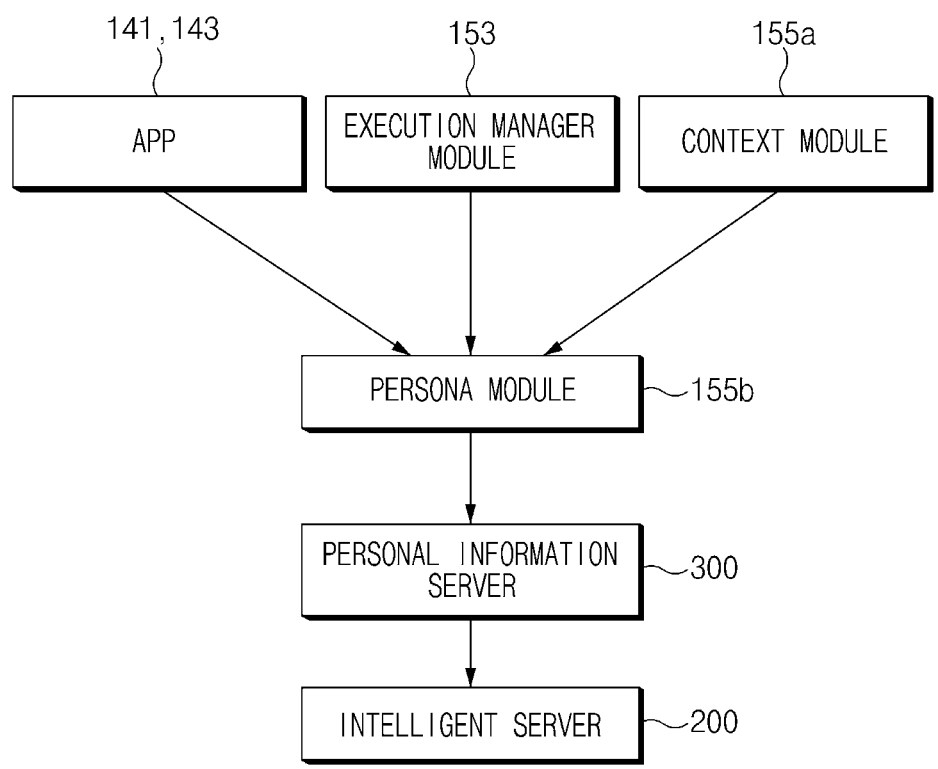
FIG. 7 illustrates that a persona module of an intelligent service module manages information of a user according to an embodiment of the present disclosure.

FIG. 7 illustrates that a persona module of an intelligent service module manages information of a user according to an embodiment of the present disclosure.

Referring to FIG. 7, the persona module 155b may receive information of the user terminal 100 from the apps 141 and 143, the execution manager module 153, or the context module 155a. The apps 141 and 143 and the execution manager module 153 may store information about the result obtained by executing the actions 141b and 143b of an app in an action log database. The context module 155a may store information about a current state of the user terminal 100 in a context database. The persona module 155b may receive the stored information from the action log database or the context database. For example, data stored in the action log database and the context database may be analyzed by an analysis engine and may be transmitted to the persona module 155b.

According to an embodiment, the persona module 155b may transmit information received from the apps 141 and 143, the execution manager module 153, or the context module 155a to the suggestion module 155c. For example, the persona module 155b may transmit the data stored in the action log database or the context database to the suggestion module 155c.

According to an embodiment, the persona module 155b may transmit the information received from the apps 141 and 143, the execution manager module 153, or the context module 155a to the personal information server 300. For example, the persona module 155b may periodically transmit the data, which is accumulated and stored in the action log database or the context database, to the personal information server 300.

According to an embodiment, the persona module 155b may transmit the data stored in the action log database or the context database to the suggestion module 155c. User information generated by the persona module 155b may be stored in a persona database. The persona module 155b may periodically transmit the user information stored in the persona database to the personal information server 300. According to an embodiment, the information transmitted to the personal information server 300 by the persona module 155b may be stored in the persona database. The personal information server 300 may infer user information necessary to generate a path rule of the intelligent server 200 by using the information stored in the persona database.

According to an embodiment, the user information that the persona module 155b estimates by using the transmitted information may include profile information or preference information. The profile information or the preference information may be inferred through an account of the user and accumulated information.

The profile information may include personal information of the user. For example, the profile information may include demographic information of the user. For example, the demographic information may include gender, age, or the like of the user. For another example, the profile information may include life event information. For example, the life event information may be estimated by comparing log information with a life event model and may be strengthened by analyzing a behavior pattern. For another example, the profile information may include interest information. For example, the interest information may include shopping items of interest, interesting fields (e.g., sports, politics, and the like). For another example, the profile information may include activity area information. For example, the activity area information may include information about a house, a work place, or the like. The information about the activity area may include information about an area where a priority is recorded based on accumulated stay time and the number of visits as well as information about a location of a place. For another example, the profile information may include activity time information. For example, the activity time information may include information about a wakeup time, a commute time, a sleep time, or the like. The information about the commute time may be inferred by using the activity area information (e.g., information about a house and a workplace). The information about the sleep time may be inferred through an unused time of the user terminal 100.

The preference information may include preference information of the user. For example, the preference information may include information about app preference. For example, the app preference may be inferred through a usage log (e.g., a time- and place-specific usage log) of an app. The app preference may be used to determine an app to be executed depending on a current state (e.g., time or place) of the user. For another example, the preference information may include information about contact preference. For example, the contact preference may be inferred by analyzing information about a contact frequency (e.g., a time- and place-specific frequency of contacting) of a contact. The contact preference may be used to determine a contact to be contacted depending on a current state (e.g., a contact for duplicate names) of the user. For another example, the preference information may include setting information. For example, the setting information may be inferred by analyzing information about setting frequency (e.g., a time- and place-specific frequency of setting a setting value) of a specific setting value. The setting information may be used to set a specific setting value depending on the current state (e.g., a time, a place, or a situation) of the user. For another example, the preference information may include place preference. For example, the place preference may be inferred through visit history (e.g., a time-specific visit history) of a specific place. The place preference may be used to determine a place to visit depending on the current state (e.g., time) of the user. For another example, the preference information may include instruction preference. For example, the instruction preference may be inferred through a usage frequency (e.g., a time- and place-specific usage frequency) of an instruction. The instruction preference may be used to determine an instruction pattern to be used depending on the current state (e.g., time or place) of the user. In particular, the instruction preference may include information about a menu most frequently selected by the user in the current state of an app being executed by analyzing the log information.

Figure 8:
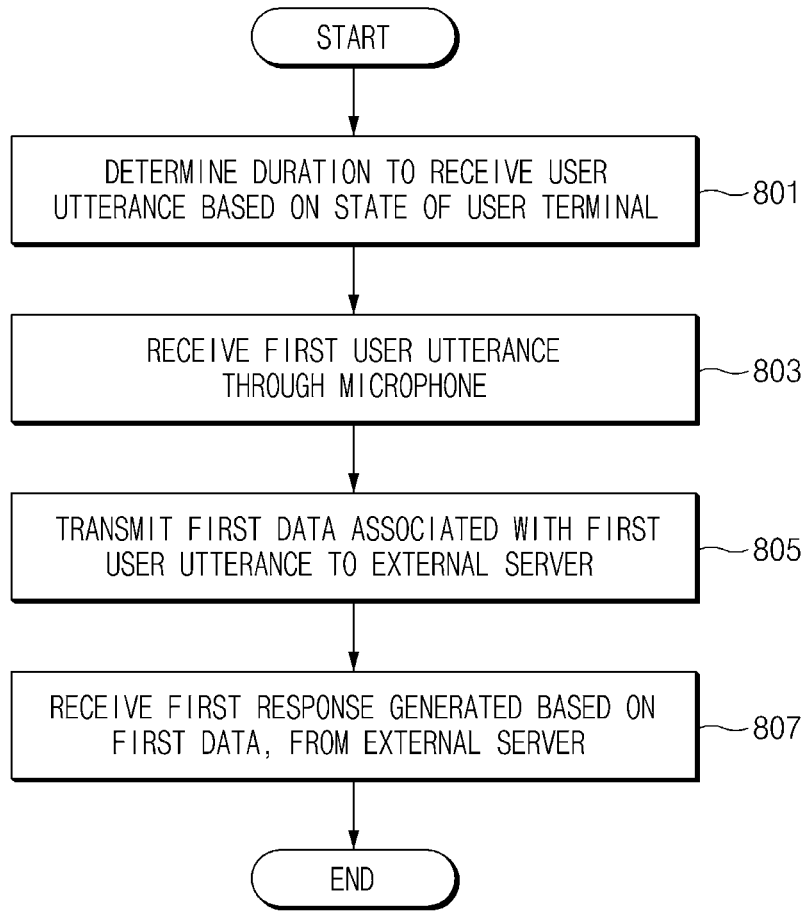
FIG. 8 illustrates a flowchart of a method of receiving a user utterance for a duration determined depending on the state of a user terminal and performing a specified operation according to an embodiment of the present disclosure.

FIG. 8 illustrates a flowchart of a method of receiving a user utterance for a duration determined depending on the state of a user terminal and performing a specified operation according to an embodiment.

Hereinafter, it is assumed that the user terminal 100 described with reference to FIG. 2 performs the process of FIG. 8. In addition, in descriptions of FIG. 8, it is understood that the operation described as being performed by the user terminal 100 is controlled by the processor 150 of the user terminal 100.

Alternatively, the process of FIG. 8 may be implemented with instructions capable of being performed (or executed) by the processor 150 of the user terminal 100. For example, the instructions may be stored in a computer-readable recording medium or the memory 140 of the user terminal 100 illustrated in FIG. 2.

According to an embodiment, before operation 801, the processor 150 may receive a user input to activate an intelligent system (or intelligent app).

According to an embodiment, the user terminal 100 may include at least one of the touchscreen display 120 or a physical button. According to an embodiment, the processor 150 may receive a user input to activate the intelligent system, through the touchscreen display 120 or the physical button.

For example, the processor 150 may receive the user input to activate the intelligent system, through the hardware key 112 of the user terminal 100 illustrated in FIG. 3. For another example, the processor 150 may receive a user input to touch the speech recognition button 121a in the UI 121 of an intelligent app to enter a voice 111b in a state where the UI 121 of the intelligent app in FIG. 3 is displayed on the display 120.

According to an embodiment, the user input may include a voice input to wake the intelligent system.

For example, in the case where the microphone 111 is activated, when a specified voice input (e.g., hi bixby or wake up!) is received through the microphone 111, the processor 150 may activate the intelligent system (e.g., the intelligent agent 151 of FIG. 2).

According to an embodiment, in the case where the microphone 111 is not activated, the processor 150 may activate the microphone 111 in response to the reception of a user input (e.g., a physical button input) to activate the intelligent system.

In operation 801, the processor 150 may determine at least part of duration to receive a user utterance through the microphone 111, based at least partly on the state of the user terminal 100. According to an embodiment, the duration may include a time to wait for user utterance reception. For example, the duration may be from a point in time when a user input to activate the intelligent system is received, to a point in time when the reception standby of a user utterance to be transmitted to an external server (e.g., the intelligent server 200 of FIG. 2) ends. In an embodiment, the point in time when the reception standby of the user utterance ends may be a point in time when the microphone 111 is deactivated or a point in time when the processor 150 terminates the reception of the user utterance.

According to an embodiment, the processor 150 may determine that the duration is the default value (e.g., 6 seconds) of the pre-specified duration. According to another embodiment, the processor 150 may determine the duration based at least partly on the state of the user terminal 100.

According to an embodiment, the processor 150 may determine a first duration based at least partly on the state of the user terminal 100. According to an embodiment, the first duration may be from a first point in time when the first user utterance is determined as ending, to a second point in time. According to an embodiment, the second point in time may be a point in time when the microphone 111 is turned off.

According to an embodiment, the state of the user terminal 100 may be at least partly associated with at least one of a currently active application program, a currently active skill, a currently active chat bot, or a locked/unlocked state of an electronic device.

According to an embodiment, the currently active application program may be an application program currently executed by the processor 150 in foreground mode. According to an embodiment, the currently active application program may be an application program associated with a screen currently displayed on the display 120. According to an embodiment, the currently active skill may be a function currently provided by the processor 150. According to an embodiment, currently active chat bot may be the chat bot of the intelligent system, and the state of the user terminal 100 associated with the chat bot may include dialog context with the chat bot. According to an embodiment, the locked/unlocked state may be a locked state or an unlocked state, which is set in a fingerprint authentication scheme, a face recognition scheme, a pin number scheme, a password scheme, an iris authentication scheme, or the like.

According to an embodiment, the state of the user terminal 100 may be at least partly associated with the user interface currently displayed on the display 120. According to an embodiment, the user interface may include at least one input field, and the state of the user terminal 100 may be at least partly associated with at least one of at least one input field. According to an embodiment, the state of the user terminal 100 may be associated with the feature (e.g., the length of an input field, whether an input field is filled, or the like) of the at least one input field. According to an embodiment, the state of the user terminal 100 may be associated with the feature of an input field without an input value, the activated input field, or the focused input field, among a plurality of input fields.

For example, the user interface for a calendar app may include a title input field, a time input field, a place input field, and a memo input field. In an embodiment, the length of the memo input field may be longer than the length of the time input field. In an embodiment, the processor 150 may determine a first duration such that the first duration for the input to the time input field is shorter than the first duration for the input to the memo input field.

In operation 803, the processor 150 may receive a first user utterance through the microphone 111.

According to an embodiment, the processor 150 may receive the first user utterance after receiving the user input.

According to an embodiment, the processor 150 may detect a first point in time when a first user utterance ends and may keep the microphone 111 open from the first point in time to a second point in time to receive an additional utterance. In other words, the first point in time may be a point in time when the first user utterance is determined as ending, and the processor 150 may maintain the microphone 111 in an activation state for the first duration.

According to an embodiment, the processor 150 may detect a point in time when the user utterance starts and a point in time when the user utterance ends, based on voicing information.

According to an embodiment, the voicing information may include a time-axis feature, a frequency feature, or the like of an acoustic signal. For example, the voicing information may include various features capable of being used for voice signal processing such as zero-crossing rate, autocorrelation, cross correlation between frames, coherence, power, spectral power, periodicity, spectral envelop, or the like or the combination thereof.

According to an embodiment, the voicing information may include a probability value based on the statistical feature of a time-axis signal or a frequency signal.

According to an embodiment, the voicing information may include a predicted non-voice feature as well as a voice feature. For example, the voicing information may include a signal-to-noise (SNR) value, which is the ratio of the power of the estimated voice signal to the power of the estimated background noise, or a probability value of the SNR value.

According to an embodiment, the processor 150 may detect a point in time when the user utterance starts and a point in time when the user utterance ends, based on the probability value, which the voicing information includes.

For example, when a probability value that the voicing information includes exceeds a critical value, the processor 150 may determine that the acoustic signal is a voice signal; when the probability value is less than the critical value, the processor 150 may determine that the acoustic signal is a non-voice signal.

According to an embodiment, when the acoustic signal is determined as the non-voice signal and then is determined as the voice signal, the processor 150 may determine the frame of the acoustic signal, which is determined as the voice signal, as a point in time when the user utterance starts. According to an embodiment, when the acoustic signal is determined as the voice signal and then is determined as the non-voice signal, the processor 150 may determine the frame of the acoustic signal, which is determined as the non-voice signal, as a point in time when the user utterance ends.

According to an embodiment, when a second user utterance being an additional utterance is received for the first duration, the processor 150 may detect a third point in time when the second user utterance ends and may keep the microphone 111 open from the third point in time to a fourth point in time to receive the additional utterance. According to an embodiment, the period in time from the third point in time to the fourth point in time may be the same as the first duration.

According to an embodiment, when the first duration elapses while the additional utterance is not received for the first duration, the processor 150 may end the reception (or reception standby) of the user utterance. For example, the processor 150 may convert the state of the microphone 111 to a deactivation state.

In operation 805, the processor 150 may transmit first data associated with the first user utterance to an external server (e.g., the intelligent server 200) through a communication circuit.

According to an embodiment, the first data associated with the first user utterance may be a voice signal that the processor 150 receives through the microphone 111.

According to an embodiment, in the case where the second user utterance being an additional utterance is received for the first duration, the processor 150 may transmit the first data associated with the first user utterance and the second user utterance to the external server through the communication circuit.

In operation 807, the processor 150 may receive a first response generated based at least partly on the first data, from an external server through the communication circuit.

According to an embodiment, the first response may include information on a sequence of states of the user terminal 100, for the user terminal 100 to perform a task.

According to an embodiment, the processor 150 may allow the user terminal 100 to perform the task by having the sequence of states.

Hereinafter, embodiments in which the processor 150 determines a first duration based at least partly on the state of the user terminal 100 are described with reference to FIGS. 9A to 11D.

Figure 9A:
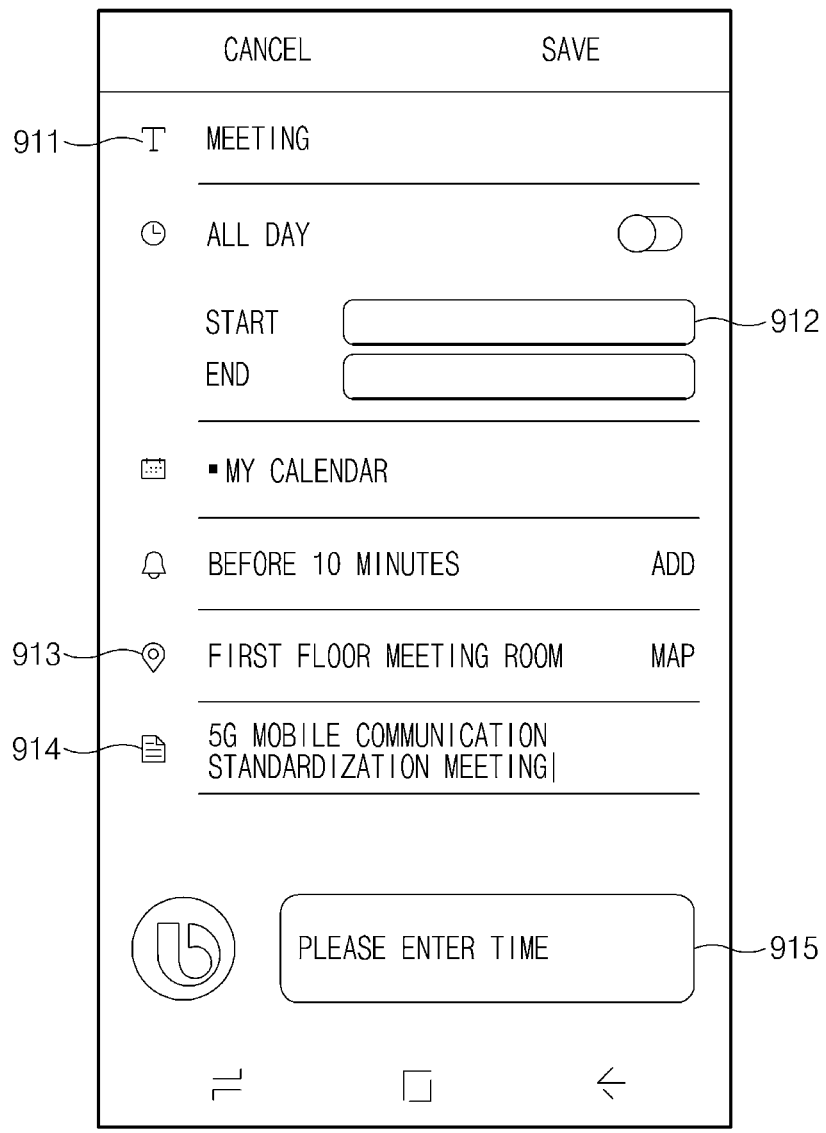
FIG. 9A illustrates a state, where a time input field is empty, in a screen for entering a schedule according to an embodiment of the present disclosure.
Figure 9B:
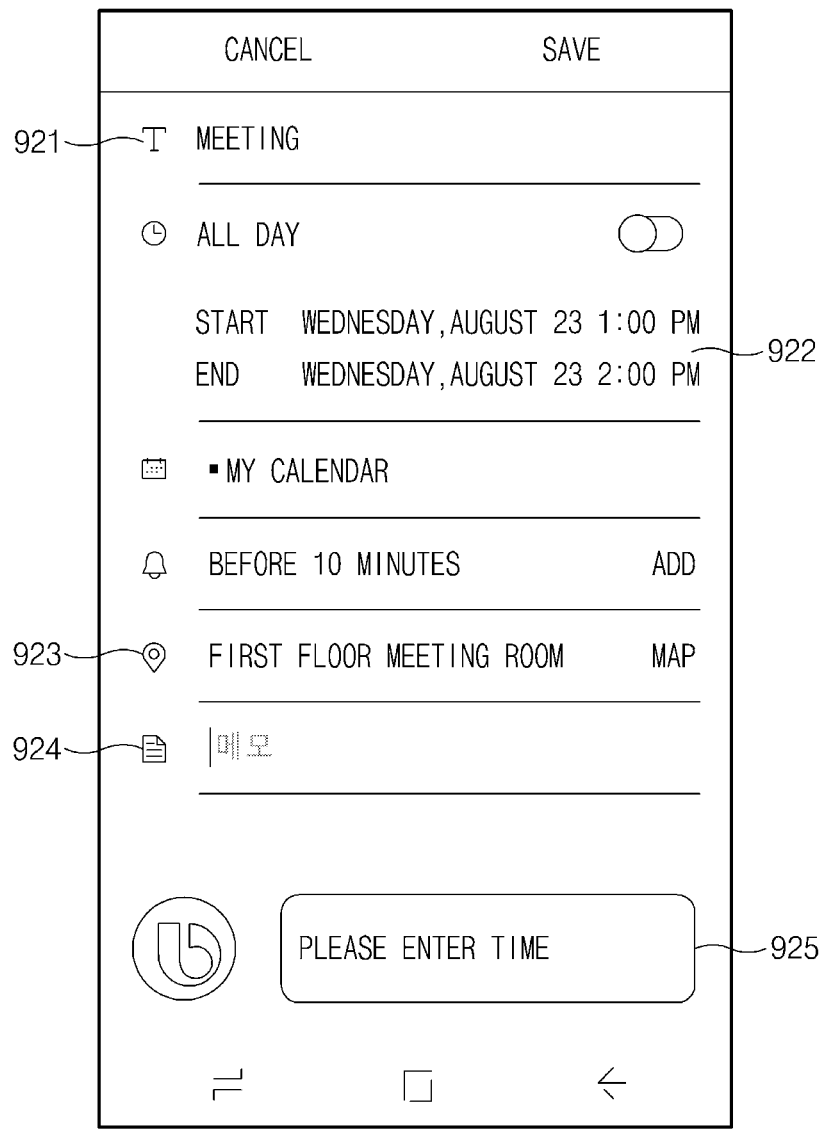
FIG. 9B illustrates a state, where a memo input field is empty, in a screen for entering a schedule according to an embodiment of the present disclosure.

FIG. 9A illustrates a state, where a time input field is empty, in a screen for entering a schedule according to an embodiment. FIG. 9B is a view illustrating a state, where a memo input field is empty, in a screen for entering a schedule according to an embodiment.

According to an embodiment, referring to FIGS. 9A and 9B, a user interface for entering a schedule may include title input fields 911 and 921 of the schedule, time input fields 912 and 922 of the schedule, place input fields 913 and 923 of the schedule, and memo input fields 914 and 924 associated with the schedule.

According to an embodiment, as illustrated in FIG. 9A, only the time input field 912 among the title input field 911, the time input field 912 of the schedule, the place input field 913 of the schedule, and the memo input field 914 associated with the schedule may be empty. According to an embodiment, the processor 150 may display a request message 915 for receiving the input value of the time input field 912 of the schedule, which is an input field without an input value, on the display 120 or may output the request message 915 through the speaker 130.

According to an embodiment, as illustrated in FIG. 9B, only the memo input field 924 associated with the schedule among the title input field 921, the time input field 924 of the schedule, the place input field 923 of the schedule, and the memo input field 924 associated with the schedule may be empty. According to an embodiment, the processor 150 may display a request message 925 for receiving the input value of the memo input field 924 associated with the schedule, which is an input field without an input value, on the display 120 or may output the request message 915 through the speaker 130.

According to an embodiment, the lengths of the time input fields 912 and 922 of the schedule may be shorter than the lengths of the memo input fields 914 and 924 associated with the schedule, respectively. According to an embodiment, the processor 150 may determine a first duration, which is from a first point in time when a first user utterance is determined as ending to a second point in time, based on the lengths of the input fields.

In an embodiment, the processor 150 may determine the first duration such that the first duration for receiving the input value of the time input field 912 is shorter than the first duration for receiving the input value of the memo input field 924. For example, the first duration for receiving the input value of the time input field 912 may be 0.3 seconds, and the first duration for receiving the input value of the memo input field 924 may be 0.8 seconds.

According to an embodiment, the processor 150 may determine the first duration such that the first duration is proportional to the length of the input field. According to an embodiment, in the case where the length value of the input field is shorter than a critical value, the processor 150 may determine the first duration as a time (e.g., 0.3 seconds) shorter than a preset time (e.g., 0.5 seconds). According to an embodiment, in the case where the length value of the input field is longer than the critical value, the processor 150 may determine the first duration as a time (e.g., 0.8 seconds) longer than a preset time (e.g., 0.5 seconds).

According to an embodiment, in an embodiment of FIG. 9A, the processor 150 may end the reception (or reception standby) of a voice input from a point in time when a voice input is determined as ending, after the first duration (e.g., 0.3 seconds). For example, the processor 150 may change the state of a microphone to a deactivation state. According to an embodiment, in an embodiment of FIG. 9B, the processor 150 may end the reception (or reception standby) of a voice input from a point in time when a voice input is determined as ending, after the first duration (e.g., 0.8 seconds).

Figure 10:
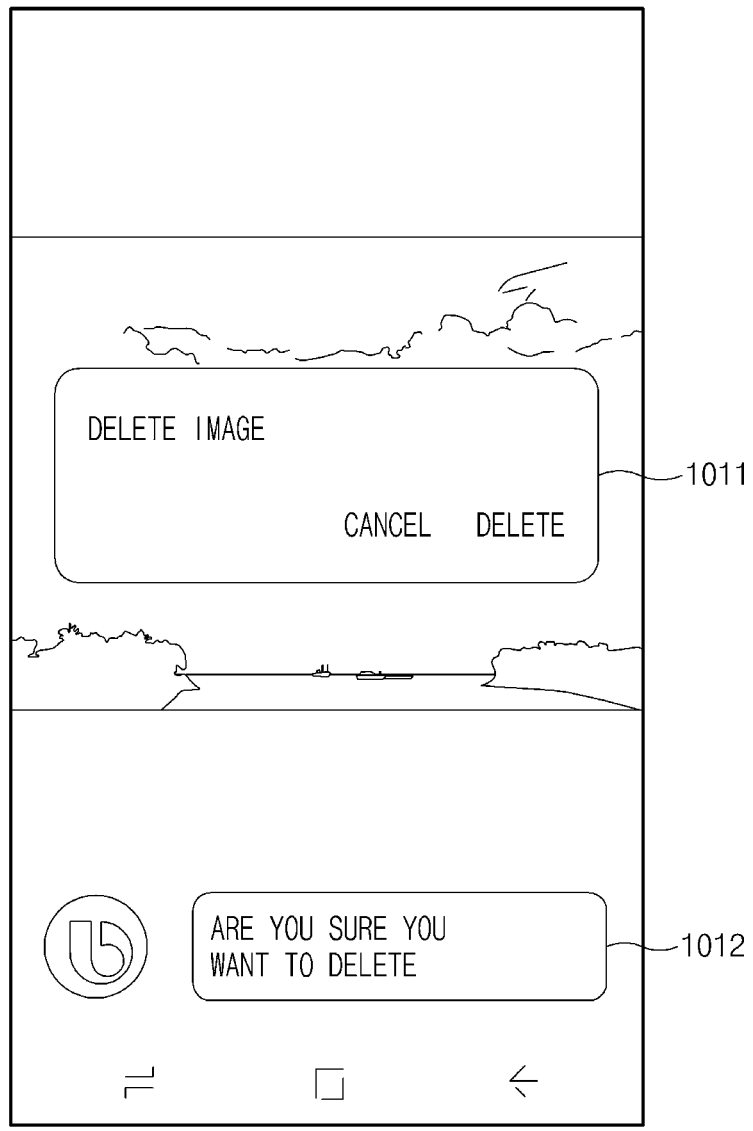
FIG. 10 illustrates a screen for receiving a selection input according to an embodiment of the present disclosure.

FIG. 10 illustrates a screen for receiving a selection input according to an embodiment.

According to an embodiment, FIG. 10 illustrates a screen on which a message for querying whether to delete an image and a selection input object 1011, when an input to delete the image is received in a gallery.

According to an embodiment, the processor 150 may display a query message 1012 for receiving a voice input associated with whether to delete the image, on the display 120.

According to an embodiment, the input requested by a currently active application program may be a selection input associated with one of 'delete' and 'cancel'. According to an embodiment, the processor 150 may determine a first duration based on the state of an application program requesting the selection input.

According to an embodiment, in the case where the input requested by a current application program is a selection input, the processor 150 may determine the first duration as a time (e.g., 0.2 seconds) shorter than a preset time (e.g., 0.5 seconds).

According to an embodiment, the processor 150 may end the reception (or reception standby) of a user utterance from a point in time when a voice input is determined as ending, after the determined first duration (e.g., 0.2 seconds). For example, the processor 150 may change the state of a microphone to a deactivation state.

Figure 11A:
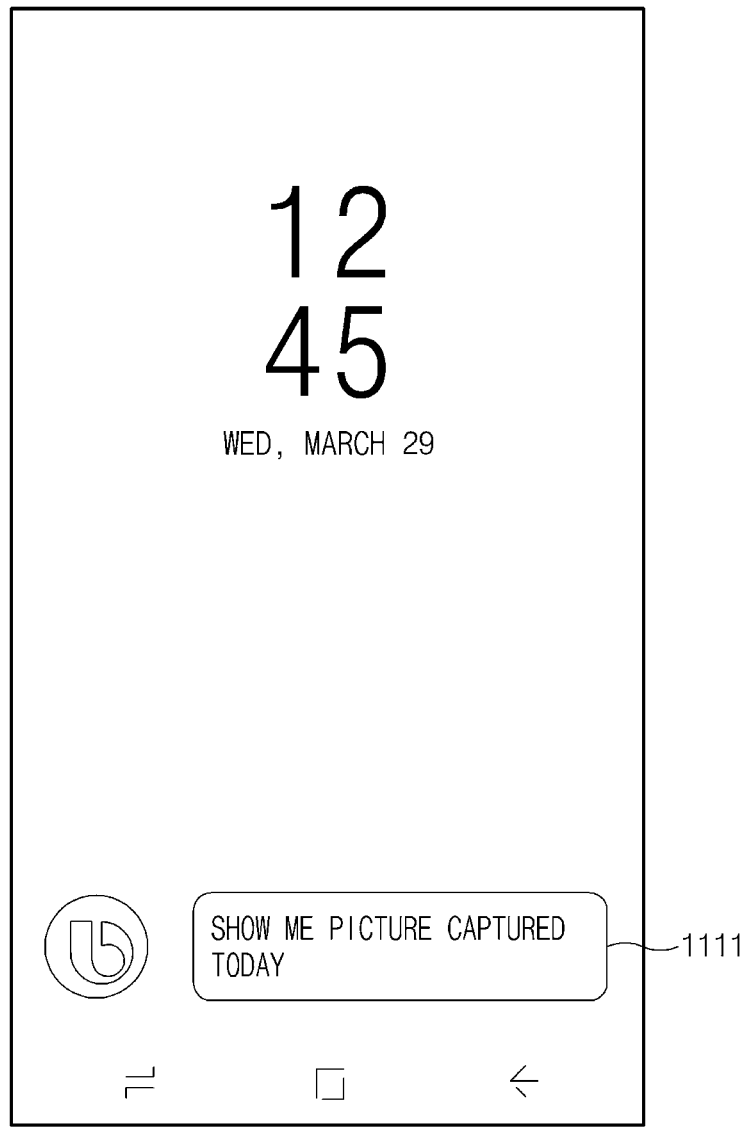
FIG. 11A illustrates a screen on which a text corresponding to a user utterance received in a locked state is displayed according to an embodiment of the present disclosure.
Figure 11B:
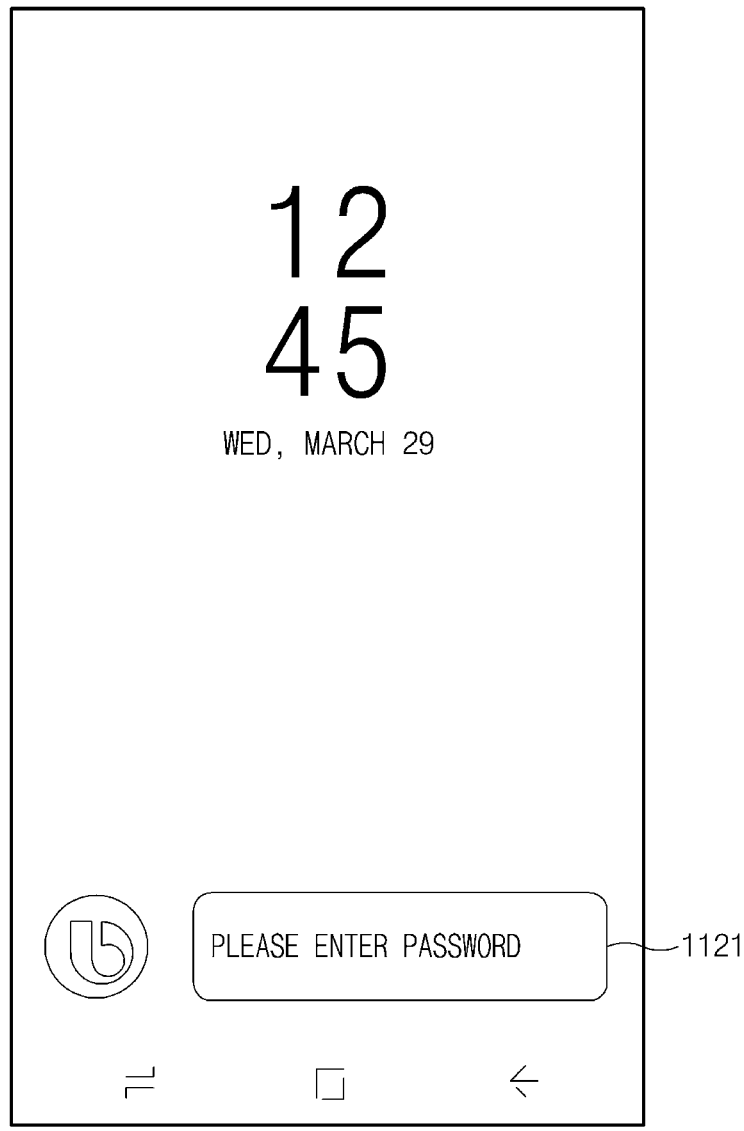
FIG. 11B illustrates a screen for requesting a password input according to an embodiment of the present disclosure.
Figure 11C:
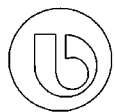
FIG. 11C illustrates a screen on which a password utterance is entered according to an embodiment of the present disclosure.
Figure 11D:
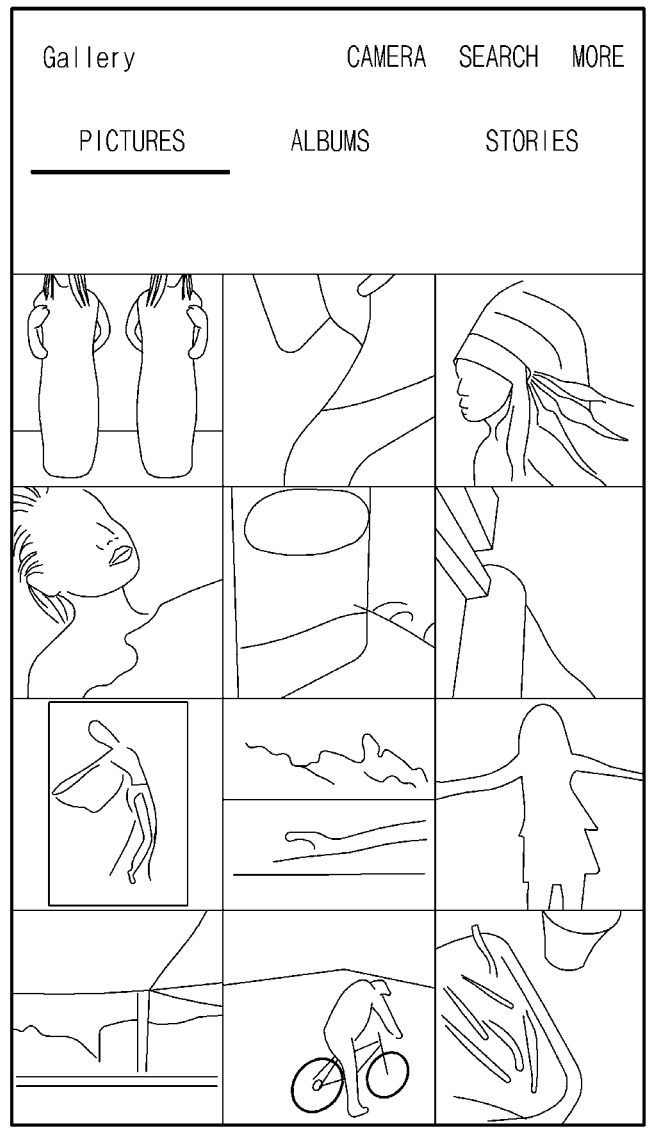
FIG. 11D illustrates a result screen on which a task according to a user utterance is performed according to an embodiment of the present disclosure.

FIG. 11A illustrates a screen on which a text corresponding to a user utterance received in a locked state is displayed according to an embodiment. FIG. 11B is a view illustrating a screen for requesting a password input according to an embodiment. FIG. 11C is a view illustrating a screen on which a password utterance is entered according to an embodiment. FIG. 11D is a view illustrating a result screen on which a task according to a user utterance is performed according to an embodiment.

According to an embodiment, the user terminal 100 may be set to a locked state of a voice password scheme. In an embodiment, when the set voice password input is received, the processor 150 may unlock the locked state.

According to an embodiment, after receiving a user input to activate an intelligent system, the processor 150 may receive a voice command input saying that "show me a picture captured today." According to an embodiment, the processor 150 may receive a voice command input together with a voice input to activate an intelligent system. For example, the processor 150 may receive a voice input saying that "hi bixby show me a picture captured today." According to an embodiment, the processor 150 may set a first duration at a point in time when the voice input is received in a lock screen, to a pre-specified time.

According to an embodiment, the processor 150 may transmit the data (e.g., the voice signal) associated with the received voice input to the intelligent server 200 and may receive a response from the intelligent server 200. According to an embodiment, the received response may include a text corresponding to the voice command input and a path rule based on a voice command.

According to an embodiment, as illustrated in FIG. 11A, the processor 150 may display a text 1111 corresponding to the voice command input.

According to an embodiment, since the user terminal 100 is in a locked state, as illustrated in FIG. 11B, the processor 150 may display (or output) a message 1121 for receiving the voice password input.

According to an embodiment, the input requested by the user terminal 100 of a locked state may be the voice password input. According to an embodiment, the processor 150 may determine the first duration based on the state of the user terminal 100 requesting the voice password input.

According to an embodiment, in the case where the input requested by the user terminal 100 is a voice password input, the processor 150 may determine the first duration as a time (e.g., 0.1 seconds) shorter than a preset time (e.g., 0.5 seconds).

According to an embodiment, the processor 150 may end the reception (or reception standby) of a voice input from a point in time when a voice input is determined as ending, after the determined first duration (e.g., 0.1 seconds). For example, the processor 150 may change the state of the microphone 111 to a deactivation state.

According to an embodiment, the processor 150 may transmit the data (e.g., the voice signal) associated with the received voice input to the intelligent server 200 and may receive a response from the intelligent server 200. According to an embodiment, the received response may include the text (e.g., open sesame) corresponding to the voice input.

According to an embodiment, as illustrated in FIG. 11C, the processor 150 may display a symbol 1131 corresponding to a password input. According to an embodiment, the number of symbols corresponding to the displayed password input may be the number of characters in a text corresponding to the voice input, and a proper symbol for displaying a password input in addition to '\*' illustrated in FIG. 11C may be used. According to an embodiment, the processor 150 may display a text corresponding to a password voice input.

According to an embodiment, in the case where the text corresponding to the received voice input is the same as or similar to a preset voice password, the processor 150 may unlock a locked state. According to an embodiment, after the locked state is unlocked, the processor 150 may execute a gallery app depending on a path rule, which is based on voice command "show me a picture captured today," and may display a screen as illustrated in FIG. 11D.

Hereinafter, according to an embodiment, embodiments in which the user terminal 100 or the intelligent server 200 determines a first duration in the case where the user terminal 100 receives a voice command input in which a part of parameters for performing a task is missed will be described.

Hereinafter, it is assumed that the user terminal 100 described with reference to FIG. 2 performs processes of FIGS. 12A and 12B. In addition, in descriptions of FIGS. 12A and 12B, it is understood that the operation described as being performed by the user terminal 100 is controlled by the processor 150 of the user terminal 100.

Figure 12A:
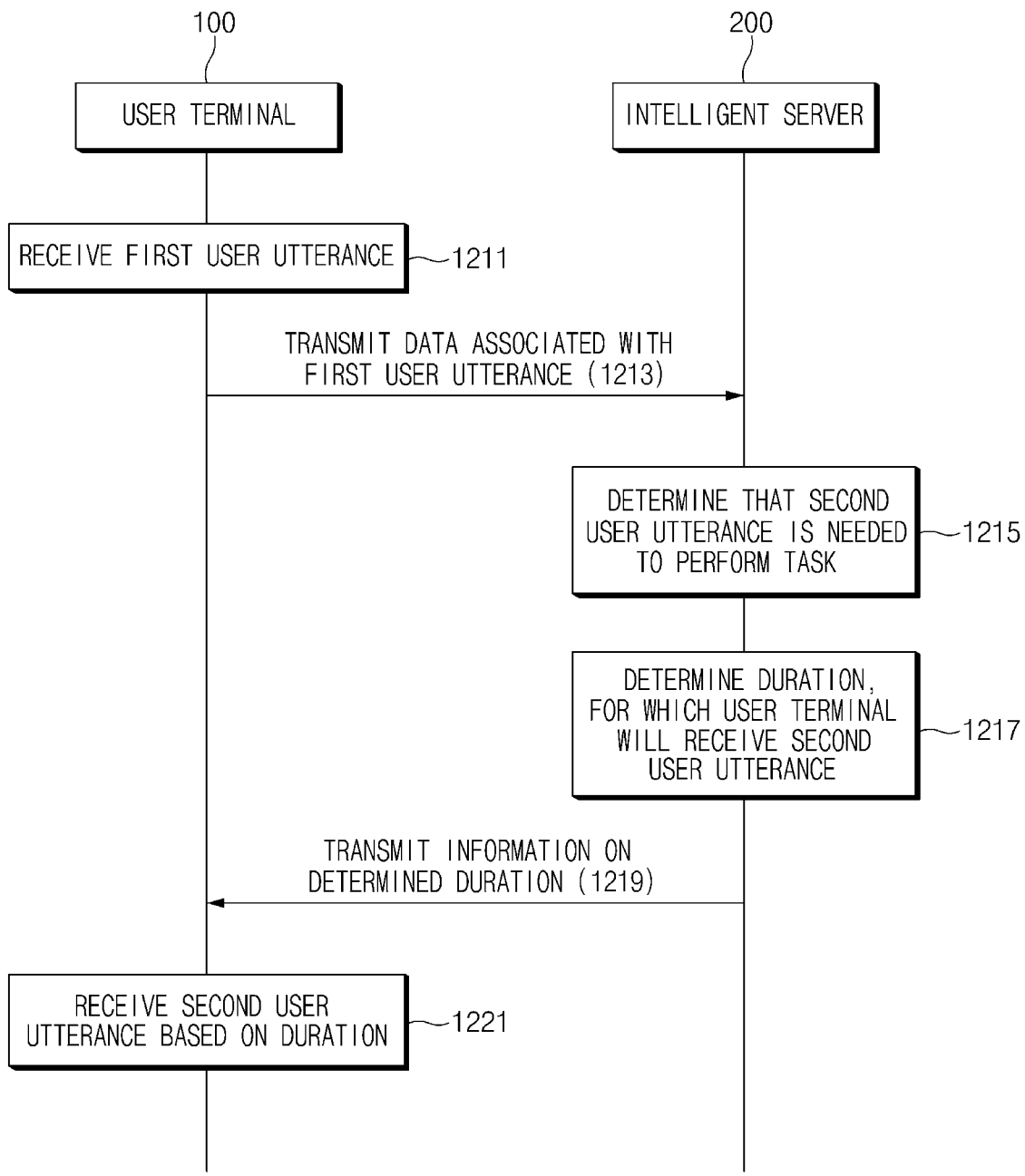
FIG. 12A illustrates a flowchart of an operations of a user terminal and an intelligent server in the case where an intelligent server determines a duration to receive a second user utterance according to an embodiment of the present disclosure.
Figure 12B:
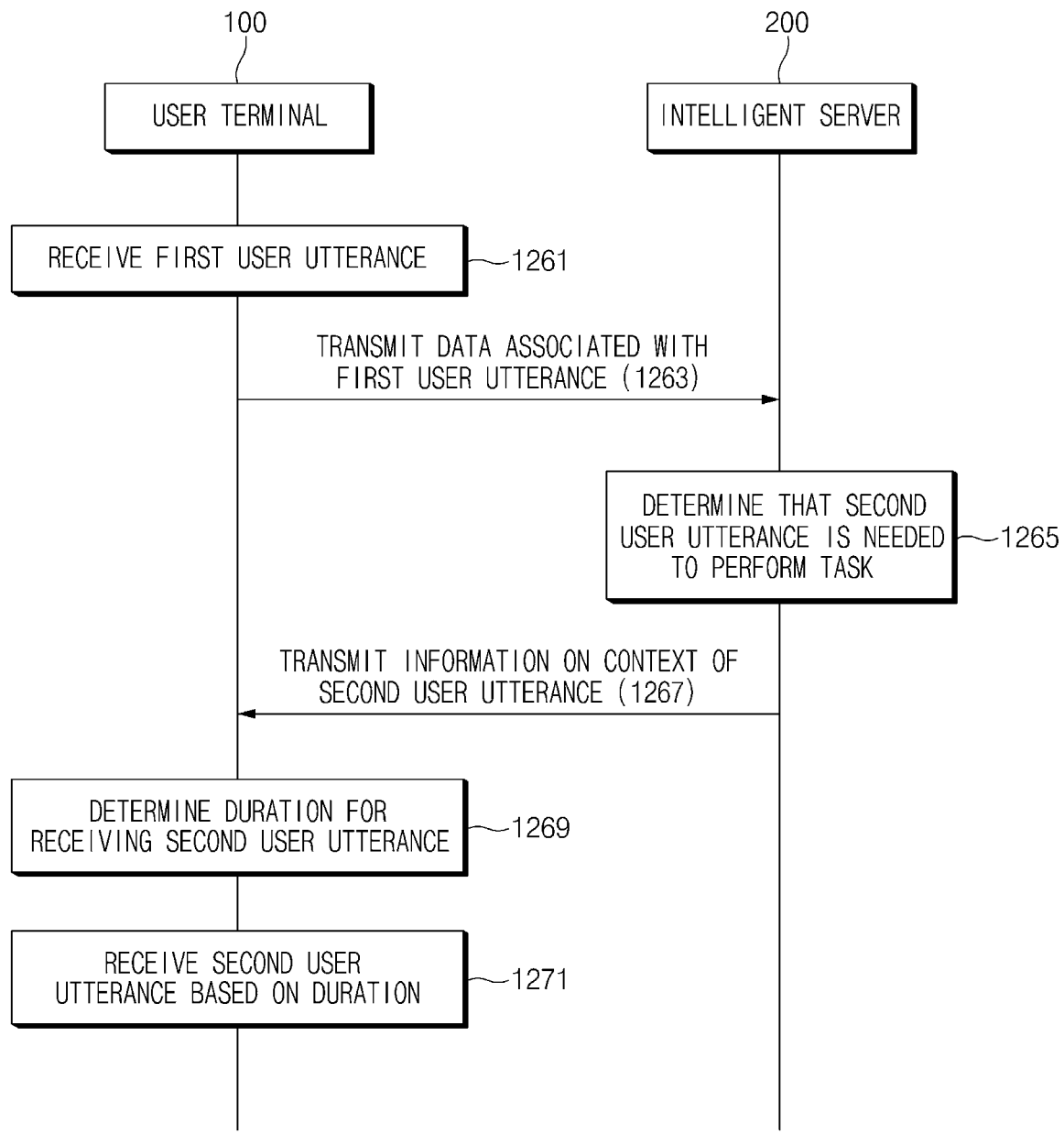
FIG. 12B illustrates a flowchart of an operations of a user terminal and an intelligent server in the case where a user terminal determines a duration to receive a second user utterance according to an embodiment of the present disclosure.

Alternatively, the processes of FIGS. 12A and 12B may be implemented with instructions capable of being performed (or executed) by the processor 150 of the user terminal 100. For example, the instructions may be stored in a computer-readable recording medium or the memory 140 of the user terminal 100 illustrated in FIG. 2.

Furthermore, it is assumed that the intelligent server 200 described with reference to FIG. 5 performs processes of FIGS. 12A and 12B. According to an embodiment, the intelligent server 200 may include at least one network interface, at least one processor, and at least one memory. According to an embodiment, the memory may store the sequence of states of at least one user terminal 100 for performing at least one task using the user terminal 100.

In addition, in descriptions of in FIGS. 12A and 12B, it is understood that the operation described as being executed by the intelligent server 200 is controlled by the processor of the intelligent server 200.

Alternatively, the processes of FIGS. 12A and 12B may be implemented with instructions capable of being performed (or executed) by the processor of the intelligent server 200. For example, the instructions may be stored in a computer-readable recording medium or the memory of the intelligent server 200.

FIG. 12A illustrates a flowchart of operations of the user terminal 100 and the intelligent server 200 in the case where the intelligent server 200 determines a duration to receive a second user utterance according to an embodiment.

According to an embodiment, before operation 1211, the processor 150 of the user terminal 100 may receive a user input to activate an intelligent system (or intelligent app).

According to an embodiment, an operation of receiving a user input to activate an intelligent system may correspond to the operation of receiving a user input to activate an intelligent system, which is performed before operation 801 described with reference to FIG. 8. According to an embodiment, embodiments capable of being applied to the operation of receiving a user input to activate an intelligent system, which is performed before operation 801 may be applied to an operation of receiving a user input to activate an intelligent system before operation 1211.

In operation 1211, the processor 150 of the user terminal 100 may receive a first user utterance through the microphone 111. According to an embodiment, the first user utterance may include a request for performing a task at least partly using the user terminal 100. According to an embodiment, the task may need one or more parameters, and the first user utterance may not include all of the one or more parameters.

In operation 1213, the processor 150 of the user terminal 100 may transmit data associated with the first user utterance to the intelligent server 200. According to an embodiment, the data associated with the first user utterance may include a voice signal corresponding to the first user utterance.

In operation 1215, the processor of the intelligent server 200 may determine that a second user utterance from a user is needed for the processor 150 of the user terminal 100 to perform a task, based on the data associated with the first user utterance.

According to an embodiment, the processor of the intelligent server 200 may determine the missed parameter among one or more parameters necessary for the processor 150 of the user terminal 100 to perform a task. According to an embodiment, the processor of the intelligent server 200 may determine that the second user utterance including the missed parameter is needed.

In operation 1217, the processor of the intelligent server 200 may determine at least part of a duration, for which the user terminal 100 may receive the second user utterance, based at least partly on at least one of the state of the user terminal 100, the first user utterance, or the context of the second user utterance.

According to an embodiment, in the case where an intelligent app receives a user utterance in the form of the dialog with a user to process the user utterance, the processor of the intelligent server 200 may determine the at least part of the duration to receive the second user utterance depending on the type of a parameter (e.g., an address, a shipping tracking number, a name, a phone number, or the like) required by the intelligent server 200.

According to an embodiment, the processor of the intelligent server 200 may determine the first duration based at least partly on at least one of the state of the user terminal 100, the first user utterance, or the context of the second user utterance. According to an embodiment, the first duration may be from a first point in time when the second user utterance received through the microphone of the user terminal 100 is determined as ending, to a second point in time. According to an embodiment, the second point in time may be a point in time when the microphone 111 is turned off.

According to an embodiment, the state of the user terminal 100 may be at least partly associated with at least one of a currently active application program, a currently active skill, a currently active chat bot, or a locked/unlocked state of an electronic device.

According to an embodiment, the context of the second user utterance may be associated with the missed parameter among one or more parameters necessary to perform a task. For example, a recipient parameter among the recipient parameter and a message content parameter, which are necessary to perform a task to transmit a text message, may be missed. In an embodiment, the context of the second user utterance may be associated with the missed recipient parameter.

According to an embodiment, the processor of the intelligent server 200 may generate a response based on the data associated with the first user utterance to transmit the generated response to the user terminal 100. According to an embodiment, the context of the second user utterance may be a state where the processor 150 of the user terminal 100 stops an operation based on the response while performing the task.

According to an embodiment, operation 1217 may correspond to above-described operation 801, and embodiments capable of being applied to operation 801 may be applied to operation 1217.

In operation 1219, the processor of the intelligent server 200 may transmit information on at least part of the determined duration, to the user terminal 100.

According to an embodiment, the information on at least part of the determined duration may include a first duration.

According to an embodiment, the processor of the intelligent server 200 may further transmit information on a sequence of states of the user terminal 100, which allows the user terminal 100 to perform the task, to the user terminal 100.

According to an embodiment, the processor of the intelligent server 200 may further transmit a message for requesting a second user utterance including the missed parameter, to the user terminal 100.

According to an embodiment, information on at least part of the duration, information on a sequence of states of the user terminal 100, and a message for requesting the second user utterance, which the processor of the intelligent server 200 transmits, may correspond to a response to data transmission associated with the first user utterance.

In operation 1221, the processor 150 of the user terminal 100 may receive a second user utterance through the microphone 111, based on the duration.

According to an embodiment, the processor 150 of the user terminal 100 may detect a first point in time when the second user utterance ends and may keep the microphone 111 open from the first point in time to a second point in time to receive an additional utterance. In other words, the first point in time may be a point in time when the second user utterance is determined as ending, and the processor 150 of the user terminal 100 may maintain the microphone 111 in an activation state for the first duration.

According to an embodiment, when a third user utterance being an additional utterance is received for the first duration, the processor 150 of the user terminal 100 may detect a third point in time when the third user utterance ends and may keep the microphone 111 open from the third point in time to a fourth point in time to receive the additional utterance. According to an embodiment, the period in time from the third point in time to the fourth point in time may be the same as the first duration.

According to an embodiment, when the first duration elapses while the additional utterance is not received for the first duration, the processor 150 of the user terminal 100 may end the reception (or reception standby) of an additional utterance. For example, the processor 150 may convert the state of the microphone 111 to a deactivation state.

According to an embodiment, operation 1221 may correspond to above-described operation 803, and embodiments capable of being applied to operation 803 may be applied to operation 1221.

FIG. 12B illustrates a flowchart of operations of the user terminal 100 and the intelligent server 200 in the case where the user terminal 100 determines a duration to receive a second user utterance according to an embodiment.

According to an embodiment, before operation 1261, the processor 150 of the user terminal 100 may receive a user input to activate an intelligent system (or intelligent app).

According to an embodiment, an operation of receiving a user input to activate an intelligent system may correspond to the operation of receiving a user input to activate an intelligent system, which is performed before operation 801 described with reference to FIG. 8. According to an embodiment, embodiments capable of being applied to the operation of receiving a user input to activate an intelligent system, which is performed before operation 801 may be applied to an operation of receiving a user input to activate an intelligent system before operation 1261.

In operation 1261, the processor 150 of the user terminal 100 may receive a first user utterance through the microphone 111. According to an embodiment, the first user utterance may include a request for performing a task at least partly using the user terminal 100. According to an embodiment, the task may need one or more parameters, and the first user utterance may not include all of the one or more parameters.

In operation 1263, the processor 150 of the user terminal 100 may transmit data associated with the first user utterance to the intelligent server 200. According to an embodiment, the data associated with the first user utterance may include a voice signal corresponding to the first user utterance.

In operation 1265, the processor of the intelligent server 200 may determine that a second user utterance from a user is needed for the processor 150 of the user terminal 100 to perform a task, based on the data associated with the first user utterance.

According to an embodiment, the processor of the intelligent server 200 may determine the missed parameter among one or more parameters necessary for the processor 150 of the user terminal 100 to perform a task. According to an embodiment, the processor of the intelligent server 200 may determine that the second user utterance including the missed parameter is needed.

In operation 1267, the processor of the intelligent server 200 may transmit information on the context of the second user utterance to the user terminal 100.

According to an embodiment, the context of the second user utterance may be associated with the missed parameter among one or more parameters necessary to perform a task.

According to an embodiment, the processor of the intelligent server 200 may generate a response based on the data associated with the first user utterance to transmit the generated response to the user terminal 100. According to an embodiment, the context of the second user utterance may be a state where the processor 150 of the user terminal 100 stops an operation based on the response while performing the task.

According to an embodiment, the processor of the intelligent server 200 may further transmit information on a sequence of states of the user terminal 100, which allows the user terminal 100 to perform the task, to the user terminal 100.

According to an embodiment, the processor of the intelligent server 200 may further transmit a message for requesting a second user utterance including the missed parameter, to the user terminal 100.

According to an embodiment, information on at least part of the duration, information on a sequence of states of the user terminal 100, and a message for requesting the second user utterance, which the processor of the intelligent server 200 transmits, may correspond to a response to data transmission associated with the first user utterance.

In operation 1269, the processor 150 of the user terminal 100 may determine at least part of a duration, for which the user terminal 100 may receive the second user utterance, based at least partly on at least one of the state of the user terminal 100, the first user utterance, or the context of the second user utterance.

According to an embodiment, the processor of the intelligent server 200 may determine the first duration based at least partly on at least one of the state of the user terminal 100, the first user utterance, or the context of the second user utterance. According to an embodiment, the first duration may be from a first point in time when the second user utterance received through the microphone of the user terminal 100 is determined as ending, to a second point in time. According to an embodiment, the second point in time may be a point in time when the microphone 111 is turned off.

According to an embodiment, the state of the user terminal 100 may be at least partly associated with at least one of a currently active application program, a currently active skill, a currently active chat bot, or a locked/unlocked state of an electronic device.

According to an embodiment, operation 1269 may correspond to above-described operation 801, and embodiments capable of being applied to operation 801 may be applied to operation 1269.

In operation 1271, the processor 150 of the user terminal 100 may receive a second user utterance through the microphone 111, based on the duration.

According to an embodiment, operation 1271 may correspond to above-described operation 1221, and embodiments capable of being applied to operation 1221 may be applied to operation 1271.

Hereinafter, embodiments in which the user terminal 100 or the intelligent server 200 determines a first duration in the case where the user terminal 100 receives a voice command input in which a part of parameters for performing a task is missed will be described with reference to FIGS. 13A to 13D.

Figure 13A:
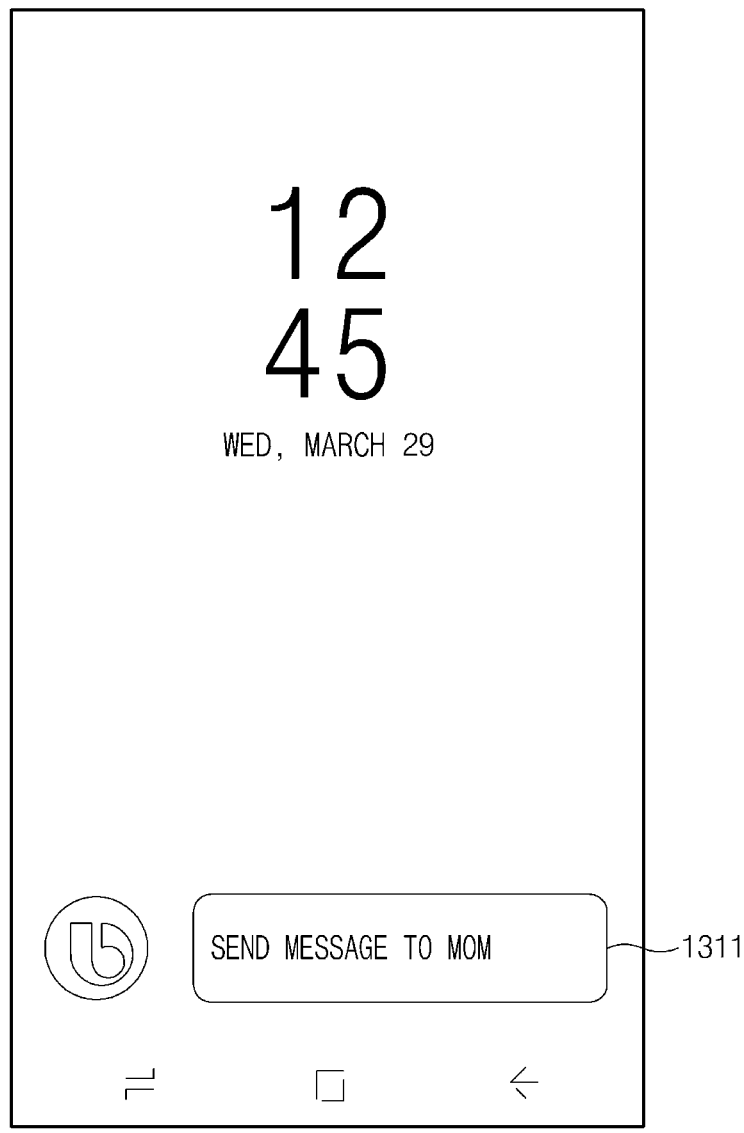
FIG. 13A illustrates a screen, on which a text corresponding to a user utterance in which some parameter is missed is displayed according to an embodiment of the present disclosure.
Figure 13B:
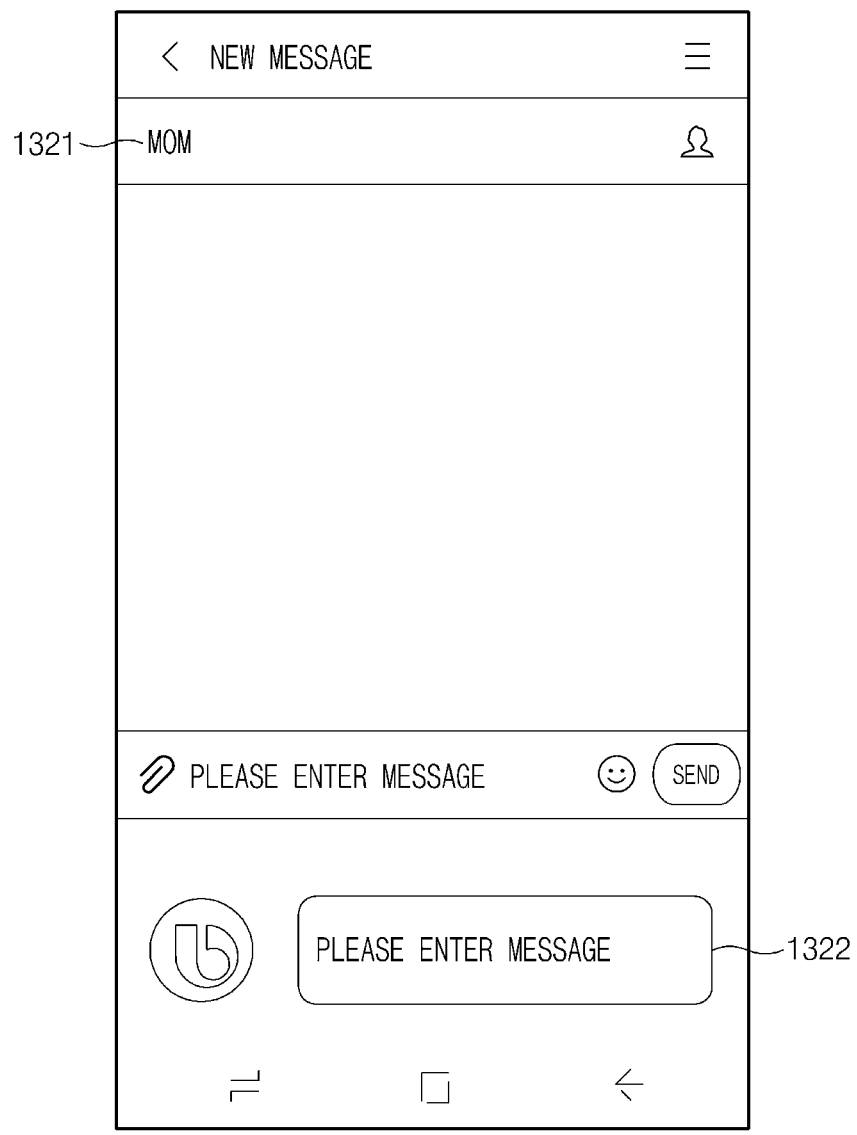
FIG. 13B illustrates a screen, on which a request message for obtaining the missed parameter is displayed according to an embodiment of the present disclosure.

FIG. 13A illustrates a screen, on which a text corresponding to a user utterance in which some parameter is missed is displayed according to an embodiment. FIG. 13B is a view illustrating a screen, on which a request message for obtaining the missed parameter is displayed according to an embodiment.

According to an embodiment, after receiving a user input to activate an intelligent system, the processor 150 of the user terminal 100 may receive a first user utterance saying that "send a message to Mom."

According to an embodiment, the first user utterance may include a request for performing a task to transmit a text message, at least partly using the user terminal 100. In an embodiment, the first user utterance may miss a message content parameter among a recipient parameter and the message content parameter, which are necessary to perform the task to transmit the text message.

According to an embodiment, the processor 150 of the user terminal 100 may transmit data (e.g., a voice signal) associated with the received first user utterance to the intelligent server 200.

According to an embodiment, the processor of the intelligent server 200 may determine that a second user utterance including a message content parameter, which is received from a user, is needed for the processor 150 of the user terminal 100 to perform a task, based on the data associated with the first user utterance.

According to an embodiment, the processor of the intelligent server 200 may determine a first duration based on the feature of the missed message content parameter. According to an embodiment, the message content text may be a long text of 100 characters or more. According to an embodiment, the processor of the intelligent server 200 may determine the first duration as a time (e.g., 1 second) longer than a preset time (e.g., 0.5 seconds), based on the feature of the message content parameter, which may be a long text.

According to an embodiment, the processor of the intelligent server 200 may transmit information on the first duration to the user terminal 100.

According to an embodiment, the processor of the intelligent server 200 may further transmit information on a sequence of states of the user terminal 100, which allows the user terminal 100 to perform a task to transmit a text message, to the user terminal 100.

According to an embodiment, the processor of the intelligent server 200 may further transmit a text corresponding to the first user utterance and a message for requesting a second user utterance including the missed message content parameter, to the user terminal 100.

According to an embodiment, the processor 150 of the user terminal 100 may transmit the data associated with the first user utterance to the intelligent server 200, while receiving the first user utterance. According to an embodiment, even though the whole first user utterance is not received, the processor of the intelligent server 200 may transmit a text corresponding to at least part of the received first user utterance to the user terminal 100. According to an embodiment, the processor 150 of the user terminal 100 may display the text corresponding to at least part of the received first user utterance, on the display 120 in real time.

According to an embodiment, as illustrated in FIG. 13A, the processor 150 of the user terminal 100 may display a text 1311 corresponding to the first user utterance.

According to an embodiment, after receiving information on the sequence of states and a message for requesting the second user utterance, the processor 150 of the user terminal 100 may allow the user terminal 100 to have the information on the sequence of states, and thus may perform a part of tasks to transmit a text message. According to an embodiment, as illustrated in FIG. 13B, after performing a task, which enters a recipient 1321, being the part of tasks, the processor 150 of the user terminal 100 may display a message 1322 for requesting the second user utterance.

According to an embodiment, the processor 150 of the user terminal 100 may receive (or wait for receiving) the second user utterance through the microphone 111 for a duration.

According to an embodiment, the processor 150 of the user terminal 100 may detect a first point in time when the second user utterance ends and may keep the microphone 111 open from the first point in time for the first duration (e.g., 1 second) to receive an additional utterance. According to an embodiment, when a third user utterance being an additional utterance is received for the first duration, the processor 150 of the user terminal 100 may detect a third point in time when the third user utterance ends and may keep the microphone 111 open from the third point in time to a fourth point in time to receive the additional utterance. According to an embodiment, the period in time from the third point in time to the fourth point in time may be the same as the first duration.

According to an embodiment, after determining that the second user utterance is needed, the processor of the intelligent server 200 may further transmit information on the feature of the missed message content parameter, information on the sequence of states of the user terminal 100 for performing a part of tasks to transmit a text message, a text corresponding to the first user utterance, and a message for requesting a second user utterance including the missed message content parameter, to the user terminal 100.

According to an embodiment, the processor 150 of the user terminal 100 may determine a first duration based on the feature of the missed message content parameter.

According to an embodiment, the processor 150 of the user terminal 100 may receive the second user utterance via the microphone 111 for a duration that is based on the determined first duration.

Figure 13C:
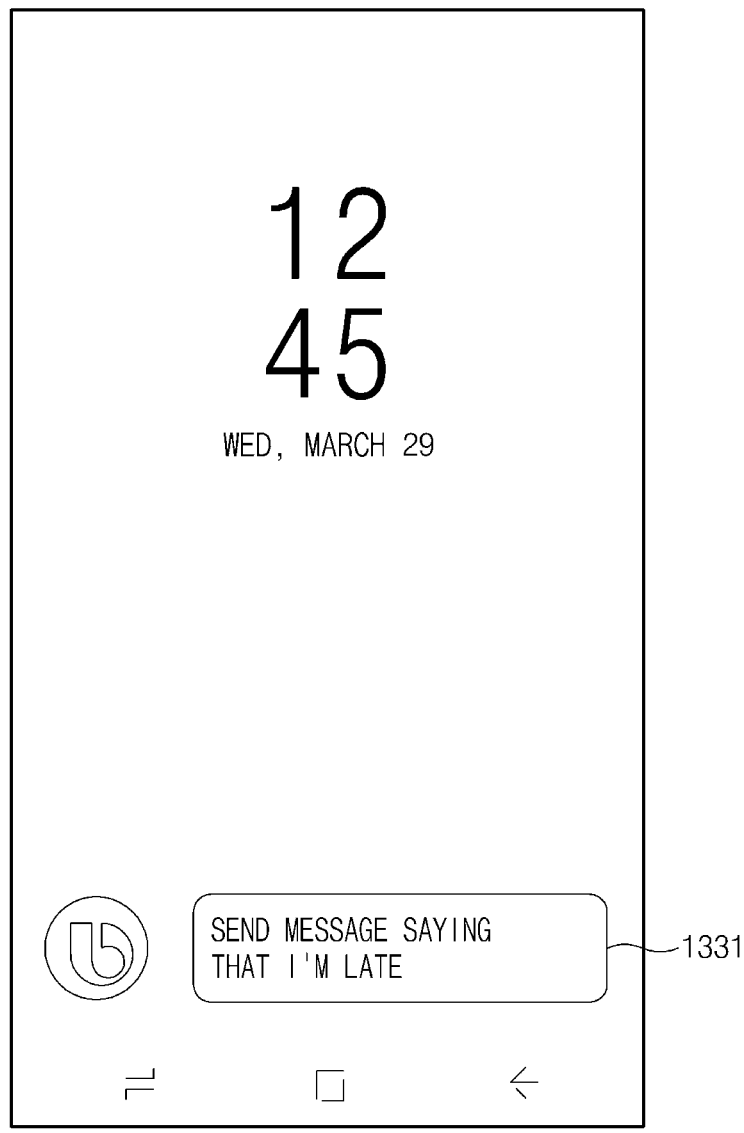
FIG. 13C illustrates a screen, on which a text corresponding to a user utterance in which some parameter is missed is displayed according to an embodiment of the present disclosure.
Figure 13D:
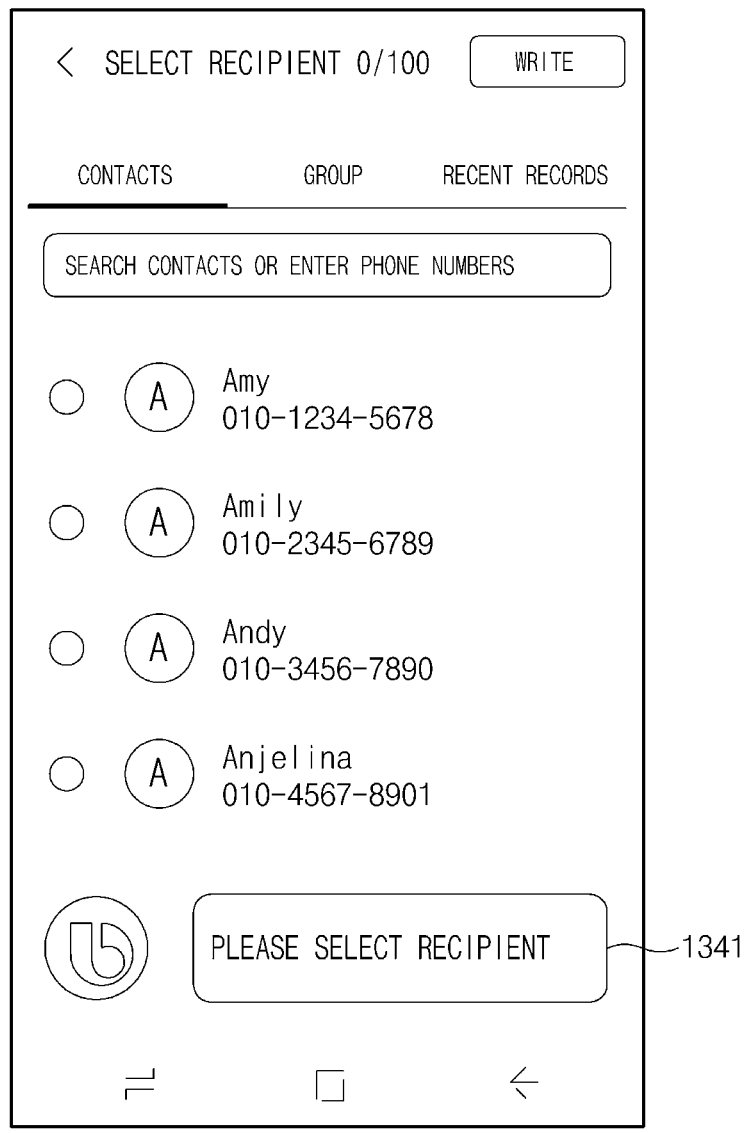
FIG. 13D illustrates a screen, on which a request message for obtaining the missed parameter is displayed according to an embodiment of the present disclosure.

FIG. 13C illustrates a screen, on which a text corresponding to a user utterance in which some parameter is missed is displayed according to an embodiment. FIG. 13D is a view illustrating a screen, on which a request message for obtaining the missed parameter is displayed according to an embodiment.

According to an embodiment, after receiving a user input to activate an intelligent system, the processor 150 of the user terminal 100 may receive a first user utterance saying that "send a message saying that I'm late."

According to an embodiment, the first user utterance may include a request for performing a task to transmit a text message, at least partly using the user terminal 100. In an embodiment, the first user utterance may miss a recipient parameter among the recipient parameter and a message content parameter, which are necessary to perform the task to transmit the text message.

According to an embodiment, the processor 150 of the user terminal 100 may transmit data (e.g., a voice signal) associated with the received first user utterance to the intelligent server 200.

According to an embodiment, the processor of the intelligent server 200 may determine that a second user utterance including a message content parameter, which is received from a user, is needed for the processor 150 of the user terminal 100 to perform a task, based on the data associated with the first user utterance.

According to an embodiment, the processor of the intelligent server 200 may determine a first duration based on the feature of the missed recipient parameter. According to an embodiment, a recipient text may be a text of 10 characters or less. According to an embodiment, the processor of the intelligent server 200 may determine the first duration as a time (e.g., 0.2 seconds) shorter than a preset time (e.g., 0.5 seconds), based on the feature of the recipient parameter, which may be a short text.

According to an embodiment, the processor of the intelligent server 200 may transmit information on the first duration to the user terminal 100.

According to an embodiment, the processor of the intelligent server 200 may further transmit information on a sequence of states of the user terminal 100, which allows the user terminal 100 to perform a task to transmit a text message, to the user terminal 100.

According to an embodiment, the processor of the intelligent server 200 may further transmit a text corresponding to the first user utterance and a message for requesting a second user utterance including the missed recipient parameter, to the user terminal 100.

According to an embodiment, the processor 150 of the user terminal 100 may transmit the data associated with the first user utterance to the intelligent server 200, while receiving the first user utterance. According to an embodiment, even though the whole first user utterance is not received, the processor of the intelligent server 200 may transmit a text corresponding to at least part of the received first user utterance to the user terminal 100. According to an embodiment, the processor 150 of the user terminal 100 may display the text corresponding to at least part of the received first user utterance, on the display 120 in real time.

According to an embodiment, as illustrated in FIG. 13C, the processor 150 of the user terminal 100 may display a text 1131 corresponding to the first user utterance.

According to an embodiment, after receiving information on the sequence of states and a message for requesting the second user utterance, the processor 150 of the user terminal 100 may allow the user terminal 100 to have the information on the sequence of states, and thus may perform a part of tasks to transmit a text message. According to an embodiment, as illustrated in FIG. 13D, after performing a task, which searches for a recipient, being the part of tasks, the processor 150 of the user terminal 100 may display a message 1341 for requesting the second user utterance.

According to an embodiment, the processor 150 of the user terminal 100 may receive the second user utterance through the microphone 111 for the duration.

According to an embodiment, the processor 150 of the user terminal 100 may detect a first point in time when the second user utterance ends and may keep the microphone 111 open from the first point in time for the first duration (e.g., 0.2 seconds) to receive an additional utterance. According to an embodiment, when a third user utterance being an additional utterance is received for the first duration, the processor 150 of the user terminal 100 may detect a third point in time when the third user utterance ends and may keep the microphone 111 open from the third point in time to a fourth point in time to receive the additional utterance. According to an embodiment, the period in time from the third point in time to the fourth point in time may be the same as the first duration.

According to an embodiment, after the second user utterance is determined as being needed, the processor of the intelligent server 200 may further transmit information on the feature of the missed recipient parameter, information on the sequence of states of the user terminal 100 for performing a part of tasks to transmit a text message, a text corresponding to the first user utterance, and a message for requesting the second user utterance including the missed recipient parameter, to the user terminal 100.

According to an embodiment, the processor 150 of the user terminal 100 may determine a first duration based on the feature of the missed recipient parameter.

According to an embodiment, the processor 150 of the user terminal 100 may receive the second user utterance via the microphone 111 for a duration that is based on the determined first duration.

Figure 14:
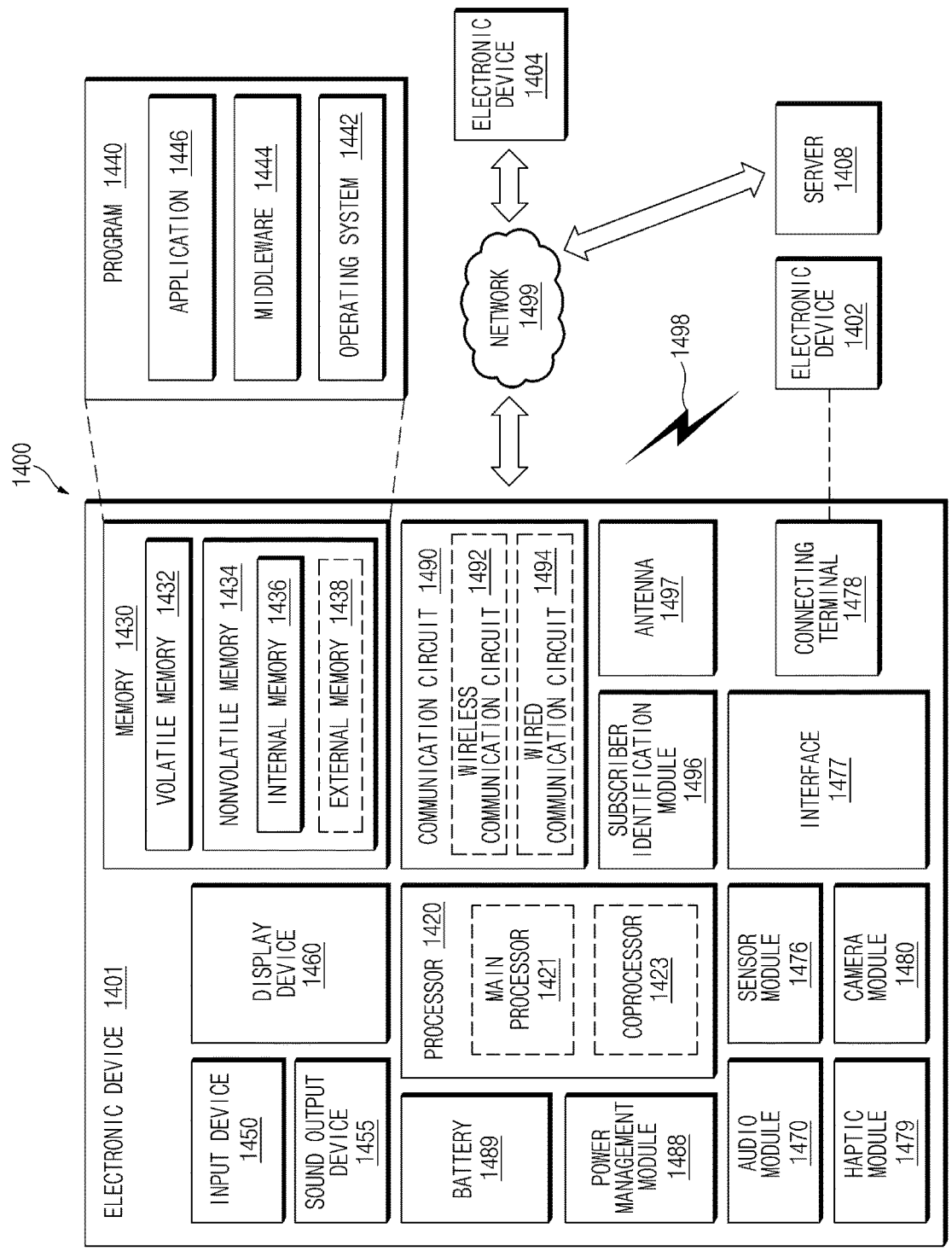
FIG. 14 illustrates an electronic device in a network environment according to various embodiments of the present disclosure.

FIG. 14 illustrates an electronic device 1401 in a network environment 1400 according to various embodiments. Referring to FIG. 14, the electronic device 1401 (e.g., the user terminal 100) may communicate with an electronic device 1402 through a first network 1498 (e.g., a short-range wireless communication) or may communicate with an electronic device 1404 or a server 1408 (e.g., the intelligent server 200) through a second network 1499 (e.g., a long-distance wireless communication) in the network environment 1400. According to an embodiment, the electronic device 1401 may communicate with the electronic device 1404 through the server 1408. According to an embodiment, the electronic device 1401 may include a processor 1420, a memory 1430, an input device 1450, a sound output device 1455, a display device 1460, an audio module 1470, a sensor module 1476, an interface 1477, a haptic module 1479, a camera module 1480, a power management module 1488, a battery 1489, a communication circuit 1490, a subscriber identification module 1496, and an antenna 1497. According to some embodiments, at least one (e.g., the display device 1460 or the camera module 1480) among components of the electronic device 1401 may be omitted or other components may be added to the electronic device 1401. According to some embodiments, some components may be integrated and implemented as in the case of the sensor module 1476 (e.g., a fingerprint sensor, an iris sensor, or an illuminance sensor) embedded in the display device 1460 (e.g., a display).

The processor 1420 (e.g., the processor 150) may operate, for example, software (e.g., a program 1440) to control at least one of other components (e.g., a hardware or software component) of the electronic device 1401 connected to the processor 1420 and may process and compute a variety of data. The processor 1420 may load a command set or data, which is received from other components (e.g., the sensor module 1476 or the communication circuit 1490), into a volatile memory 1432, may process the loaded command or data, and may store result data into a nonvolatile memory 1434. According to an embodiment, the processor 1420 may include a main processor 1421 (e.g., a central processing unit or an application processor) and a coprocessor 1423 (e.g., a graphic processing device, an image signal processor, a sensor hub processor, or a communication processor), which operates independently from the main processor 1421, additionally or alternatively uses less power than the main processor 1421, or is specified to a designated function. In this case, the coprocessor 1423 may operate separately from the main processor 1421 or embedded.

In this case, the coprocessor 1423 may control, for example, at least some of functions or states associated with at least one component (e.g., the display device 1460, the sensor module 1476, or the communication circuit 1490) among the components of the electronic device 1401 instead of the main processor 1421 while the main processor 1421 is in an inactive (e.g., sleep) state or together with the main processor 1421 while the main processor 1421 is in an active (e.g., an application execution) state. According to an embodiment, the coprocessor 1423 (e.g., the image signal processor or the communication processor) may be implemented as a part of another component (e.g., the camera module 1480 or the communication circuit 1490) that is functionally related to the coprocessor 1423. The memory 1430 may store a variety of data used by at least one component (e.g., the processor 1420 or the sensor module 1476) of the electronic device 1401, for example, software (e.g., the program 1440) and input data or output data with respect to commands associated with the software. The memory 1430 may include the volatile memory 1432 or the nonvolatile memory 1434.

The program 1440 may be stored in the memory 1430 as software and may include, for example, an operating system 1442, a middleware 1444, or an application 1446.

The input device 1450 may be a device for receiving a command or data, which is used for a component (e.g., the processor 1420) of the electronic device 1401, from an outside (e.g., a user) of the electronic device 1401 and may include, for example, a microphone, a mouse, or a keyboard.

The sound output device 1455 may be a device for outputting a sound signal to the outside of the electronic device 1401 and may include, for example, a speaker used for general purposes, such as multimedia play or recordings play, and a receiver used only for receiving calls. According to an embodiment, the receiver and the speaker may be either integrally or separately implemented.

The display device 1460 may be a device for visually presenting information to the user and may include, for example, a display, a hologram device, or a projector and a control circuit for controlling a corresponding device. According to an embodiment, the display device 1460 may include a touch circuitry or a pressure sensor for measuring an intensity of pressure on the touch.

The audio module 1470 may convert a sound and an electrical signal in dual directions. According to an embodiment, the audio module 1470 may obtain the sound through the input device 1450 or may output the sound through an external electronic device (e.g., the electronic device 1402 (e.g., a speaker or a headphone)) wired or wirelessly connected to the sound output device 1455 or the electronic device 1401.

The sensor module 1476 may generate an electrical signal or a data value corresponding to an operating state (e.g., power or temperature) inside or an environmental state outside the electronic device 1401. The sensor module 1476 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 1477 may support a designated protocol wired or wirelessly connected to the external electronic device (e.g., the electronic device 1402). According to an embodiment, the interface 1477 may include, for example, an HDMI (high-definition multimedia interface), a USB (universal serial bus) interface, an SD card interface, or an audio interface.

A connection terminal 1478 may include a connector that physically connects the electronic device 1401 to the external electronic device (e.g., the electronic device 1402), for example, an HDMI connector, a USB connector, an SD card connector, or an audio connector (e.g., a headphone connector).

The haptic module 1479 may convert an electrical signal to a mechanical stimulation (e.g., vibration or movement) or an electrical stimulation perceived by the user through tactile or kinesthetic sensations. The haptic module 1479 may include, for example, a motor, a piezoelectric element, or an electric stimulator.

The camera module 1480 may shoot a still image or a video image. According to an embodiment, the camera module 1480 may include, for example, at least one lens, an image sensor, an image signal processor, or a flash.

The power management module 1488 may be a module for managing power supplied to the electronic device 1401 and may serve as at least a part of a power management integrated circuit (PMIC).

The battery 1489 may be a device for supplying power to at least one component of the electronic device 1401 and may include, for example, a non-rechargeable (primary) battery, a rechargeable (secondary) battery, or a fuel cell.

The communication circuit 1490 may establish a wired or wireless communication channel between the electronic device 1401 and the external electronic device (e.g., the electronic device 1402, the electronic device 1404, or the server 1408) and support communication execution through the established communication channel. The communication circuit 1490 may include at least one communication processor operating independently from the processor 1420 (e.g., the application processor) and supporting the wired communication or the wireless communication. According to an embodiment, the communication circuit 1490 may include a wireless communication circuit 1492 (e.g., a cellular communication circuit, a short-range wireless communication circuit, or a GNSS (global navigation satellite system) communication circuit) or a wired communication circuit 1494 (e.g., an LAN (local area network) communication circuit or a power line communication circuit) and may communicate with the external electronic device using a corresponding communication circuit among them through the first network 1498 (e.g., the short-range communication network such as a Bluetooth, a WiFi direct, or an IrDA (infrared data association)) or the second network 1499 (e.g., the long-distance wireless communication network such as a cellular network, an internet, or a computer network (e.g., LAN or WAN)). The above-mentioned various communication circuits 1490 may be implemented into one chip or into separate chips, respectively.

According to an embodiment, the wireless communication circuit 1492 may identify and authenticate the electronic device 1401 using user information stored in the subscriber identification module 1496 in the communication network.

The antenna 1497 may include one or more antennas to transmit or receive the signal or power to or from an external source. According to an embodiment, the communication circuit 1490 (e.g., the wireless communication circuit 1492) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 1401 and the external electronic device 1404 through the server 1408 connected to the second network 1499. Each of the electronic devices 1402 and 1404 may be the same or different types as or from the electronic device 1401. According to an embodiment, all or some of the operations performed by the electronic device 1401 may be performed by another electronic device or a plurality of external electronic devices. When the electronic device 1401 performs some functions or services automatically or by request, the electronic device 1401 may request the external electronic device to perform at least some of the functions related to the functions or services, in addition to or instead of performing the functions or services by itself. The external electronic device receiving the request may carry out the requested function or the additional function and transmit the result to the electronic device 1401. The electronic device 1401 may provide the requested functions or services based on the received result as is or after additionally processing the received result. To this end, for example, a cloud computing, distributed computing, or client-server computing technology may be used.

According to an embodiment of the present disclosure, an electronic device may include a housing, a speaker positioned at a first portion of the housing, a microphone positioned at a second portion of the housing, a communication circuit positioned in or attached to the housing, a processor positioned in the housing and operatively connected to the speaker, the microphone, and the communication circuit, and a memory positioned in the housing and operatively connected to the processor. The memory may store instructions that, when executed, cause the processor to receive a user input to activate an intelligent system, to determine at least part of a duration to receive a user utterance via the microphone, based at least partly on a state of the electronic device, to receive a first user utterance via the microphone after receiving the user input, to transmit first data associated with the first user utterance to an external server via the communication circuit, and to receive a first response from the external server via the communication circuit. The first response may be generated based at least partly on the first data.

In an embodiment, the instructions may cause the processor, after receiving the user input, to detect a first point in time when the first user utterance ends and to keep the microphone open to receive an additional utterance for a first duration from the first point in time to a second point in time.

In an embodiment, the instructions may cause the processor, when a second user utterance being the additional utterance is received for the first duration, to detect a third point in time when the second user utterance ends, and to keep the microphone open to receive the additional utterance from the third point in time for a period in time the same as the first duration.

In an embodiment, the instructions may cause the processor to determine the first duration, based at least partly on the state of the electronic device.

In an embodiment, the state of the electronic device may be at least partly associated with at least one of a currently active application program, a currently active skill, a currently active chat bot, or a locked/unlocked state of the electronic device.

In an embodiment, the electronic device may further include a display exposed through the housing. The state of the electronic device may be at least partly associated with a user interface currently displayed on the display.

In an embodiment, the user interface may include at least one input field, and the state of the electronic device may be at least partly associated with at least one of the at least one input field.

In an embodiment, the first duration may be proportional to a length of the at least one input field.

In an embodiment, the user input may include a voice input to wake the intelligent system.

In an embodiment, the electronic device may further include a touchscreen display and/or a physical button, and the user input may be received via at least one of the display and/or the button.

According to an embodiment of the present disclosure, an electronic device may include a housing, a speaker positioned at a first portion of the housing, a microphone positioned at a second portion of the housing, a communication circuit positioned in or attached to the housing, a processor positioned in the housing and operatively connected to the speaker, the microphone, and the communication circuit, and a memory positioned in the housing and operatively connected to the processor. The memory may store instructions that, when executed, cause the processor to receive a first user utterance via the microphone, to transmit first data associated with the first user utterance to an external server via the communication circuit, to receive information on a context of a second user utterance for obtaining a parameter necessary to perform the task, from the external server via the communication circuit, to determine at least part of a duration to receive the second user utterance based at least partly on at least one of a state of the electronic device, the first user utterance, or the context of the second user utterance; and to keep the microphone open such that the electronic device is in a state to receive an utterance via the microphone for the duration. The first user utterance may include a request for performing a task, at least partly using the electronic device and requiring one or more parameters for execution, and the first user utterance may not include all of the one or more parameters.

In an embodiment, the instructions may cause the processor to determine a first duration based at least partly on at least one of a state of the electronic device, the first user utterance, or the context of the second user utterance, to detect a first point in time when the second user utterance ends, and to keep the microphone open to receive an additional utterance for the first duration from the first point in time to a second point in time such that the electronic device is in a state to receive an additional utterance.

In an embodiment, the state of the electronic device may be at least partly associated with at least one of a currently active application program, a currently active skill, a currently active chat bot, or a locked/unlocked state of the electronic device.

In an embodiment, the electronic device may further include a display exposed through the housing. The state of the electronic device may be at least partly associated with a user interface currently displayed on the display.

In an embodiment, the user interface may include at least one input field, and the state of the electronic device may be at least partly associated with at least one of the at least one input field.

According to an embodiment of the present disclosure, a system may include at least one network interface, at least one processor operatively connected to the network interface, and at least one memory operatively connected to the processor. The memory may store a sequence of states of at least one external electronic device to perform at least one task. The memory may further store instructions that, when executed, cause the processor to receive first data associated with a first user utterance provided via an external electronic device including a microphone, to determine that a second user utterance from a user is needed to perform the task, to determine at least part of a duration to receive the second user utterance via the external electronic device, based at least partly on a state of the external electronic device, the first user utterance, and/or a context of the second user utterance, and to provide information on the at least part of the duration to the external electronic device such that the external electronic device is in a state to receive an utterance via the microphone for the duration. The first user utterance may include a request for performing a task, at least partly using the external electronic device.

In an embodiment, the external electronic device may be configured to detect a first point in time when the second user utterance from the user ends, and to keep the microphone open to receive an additional utterance for a first duration from the first point in time to a second point in time, and the instructions may cause the processor to determine the first duration, based at least partly on the state of the external electronic device, the first user utterance, and/or a context of the second user utterance.

In an embodiment, the state of the external electronic device may be at least partly associated with at least one of a currently active application program, a currently active skill, a currently active chat bot, or a locked/unlocked state of the external electronic device.

In an embodiment, the external electronic device may further include a display. The state of the external electronic device may be at least partly associated with a user interface currently displayed on the display.

In an embodiment, the user interface may include at least one input field, and the state of the external electronic device may be at least partly associated with at least one of the at least one input field.

The electronic device according to various embodiments disclosed in the present disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the present disclosure should not be limited to the above-mentioned devices.

It should be understood that various embodiments of the present disclosure and terms used in the embodiments do not intend to limit technologies disclosed in the present disclosure to the particular forms disclosed herein; rather, the present disclosure should be construed to cover various modifications, equivalents, and/or alternatives of embodiments of the present disclosure. With regard to description of drawings, similar components may be assigned with similar reference numerals. As used herein, singular forms may include plural forms as well unless the context clearly indicates otherwise. In the present disclosure disclosed herein, the expressions "A or B," "at least one of A or/and B," "A, B, or C" or "one or more of A, B, or/and C," and the like used herein may include any and all combinations of one or more of the associated listed items. The expressions "a first," "a second," "the first," or "the second," used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic," "logical block," "part" and "circuit." The "module" may be a minimum unit of an integrated part or may be a part thereof. The "module" may be a minimum unit for performing one or more functions or a part thereof. For example, the "module" may include an application-specific integrated circuit (ASIC).

Various embodiments of the present disclosure may be implemented by software (e.g., the program 1440) including an instruction stored in a machine-readable storage media (e.g., an internal memory 1436 or an external memory 1438) readable by a machine (e.g., a computer). The machine may be a device that calls the instruction from the machine-readable storage media and operates depending on the called instruction and may include the electronic device (e.g., the electronic device 1401). When the instruction is executed by the processor (e.g., the processor 1420), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory," as used herein, is a limitation of the medium itself (i.e., tangible, not a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:
1. An electronic device comprising:
a housing;
a speaker;
a microphone;
a communication circuit;
a memory; and
a processor operatively connected to the speaker, the microphone, the communication circuit, and the memory; and
wherein the memory stores instructions that, when executed, cause the processor to:
receive a user input to activate an intelligent system;
determine at least part of a duration to receive a user utterance via the microphone, based on a state of an application requesting an input;
receive a first user utterance via the microphone after receiving the user input;
transmit first data associated with the first user utterance to an external server via the communication circuit; and
receive a first response from the external server via the communication circuit, wherein the first response is generated based at least partly on the first data.

2. The electronic device of claim 1, wherein the instructions, when executed, cause the processor to:
after receiving the user input, detect a first point in time when the first user utterance ends; and
keep the microphone open to receive an additional utterance for a first duration from the first point in time to a second point in time.

3. The electronic device of claim 2, wherein the instructions, when executed, cause the processor to:

when a second user utterance being the additional utterance is received for the first duration, detect a third point in time when the second user utterance ends; and
keep the microphone open to receive the additional utterance from the third point in time for a period in time the same as the first duration.

4. The electronic device of claim 2, wherein the instructions, when executed, cause the processor to determine the first duration, based at least partly on a state of the electronic device.

5. The electronic device of claim 4, wherein the state of the electronic device is at least partly associated with at least one of a currently active application program, a currently active skill, a currently active chat bot, or a locked/unlocked state of the electronic device.

6. The electronic device of claim 5, further comprising a display exposed through the housing, wherein the state of the electronic device is at least partly associated with a user interface currently displayed on the display.

7. The electronic device of claim 6, wherein the user interface includes at least one input field, and wherein the state of the electronic device is at least partly associated with at least one of the at least one input field.

8. The electronic device of claim 7, wherein the first duration is proportional to a length of the at least one input field.

9. The electronic device of claim 1, wherein the user input includes a voice input to wake the intelligent system.

10. The electronic device of claim 1, further comprising at least one of a touchscreen display or a physical button, wherein the user input is received via at least one of the touchscreen display or the physical button.

11. An electronic device comprising:
a housing;
a speaker;
a microphone;
a communication circuit;
a memory; and
a processor operatively connected to the speaker, the microphone, the communication circuit, and the memory; and
wherein the memory stores instructions that, when executed, cause the processor to:
receive a first user utterance via the microphone, wherein the first user utterance includes a request for performing a task, at least partly using the electronic device and requiring one or more parameters for execution, and wherein the first user utterance does not include all of the one or more parameters;
transmit first data associated with the first user utterance to an external server via the communication circuit;
receive information on a context of a second user utterance for obtaining a parameter necessary to perform the task, from the external server via the communication circuit;
determine at least part of a duration to receive the second user utterance based at least partly on at least one of a state of an application requesting an input, the first user utterance, or the context of the second user utterance; and
keep the microphone open such that the electronic device is in a state to receive an utterance via the microphone for the duration.

12. The electronic device of claim 11, wherein the instructions, when executed, cause the processor to:
determine a first duration based at least partly on at least one of a state of the electronic device, the first user utterance, or the context of the second user utterance;
detect a first point in time when the second user utterance ends; and
keep the microphone open to receive an additional utterance for the first duration from the first point in time to a second point in time such that the electronic device is in a state to receive the additional utterance.

13. The electronic device of claim 12, wherein the state of the electronic device is at least partly associated with at least one of a currently active application program, a currently active skill, a currently active chat bot, or a locked/unlocked state of the electronic device.

14. The electronic device of claim 13, further comprising a display exposed through the housing, wherein the state of the electronic device is at least partly associated with a user interface currently displayed on the display.

15. The electronic device of claim 14, wherein the user interface includes at least one input field, and
wherein the state of the electronic device is at least partly associated with at least one of the at least one input field.

16. A system comprising:
at least one network interface;
at least one processor operatively connected to the at least one network interface; and
at least one memory operatively connected to the processor, wherein the memory stores a sequence of states of at least one external electronic device to perform at least one task, and wherein the memory further stores instructions that, when executed, cause the processor to:
receive first data associated with a first user utterance provided via an external electronic device including a microphone, wherein the first user utterance includes a request for performing a task, at least partly using the external electronic device;
determine that a second user utterance from a user is needed to perform the task;
determine at least part of a duration to receive the second user utterance via the external electronic device, based at least partly on a state of an application requesting an input, the first user utterance, or a context of the second user utterance; and
provide information on the at least part of the duration to the external electronic device such that the external electronic device is in a state to receive an utterance via the microphone for the duration.

17. The system of claim 16, wherein the external electronic device is configured to:
detect a first point in time when the second user utterance from the user ends; and
keep the microphone open to receive an additional utterance for a first duration from the first point in time to a second point in time, and
wherein the instructions, when executed, cause the processor to determine the first duration, based at least partly on a state of the external electronic device, the first user utterance, or the context of the second user utterance.

18. The system of claim 17, wherein the state of the external electronic device is at least partly associated with at least one of a currently active application program, a currently active skill, a currently active chat bot, or a locked/unlocked state of the external electronic device.

19. The system of claim 18, wherein the external electronic device further comprises a display, and wherein the state of the external electronic device is at least partly associated with a user interface currently displayed on the display.

20. The system of claim 19, wherein the user interface includes at least one input field, and
   wherein the state of the external electronic device is at least partly associated with at least one of the at least one input field.

* * * * *

UNITED STATES PATENT AND TRADEMARK OFFICE
CERTIFICATE OF CORRECTION

PATENT NO. : 11,048,293 B2  
APPLICATION NO. : 16/040165  
DATED : June 29, 2021  
INVENTOR(S) : Ho Seon Shin et al.

Page 1 of 1

It is certified that error appears in the above-identified patent and that said Letters Patent is hereby corrected as shown below:

On the Title Page

Column 1, Item (72) Inventors, Lines 1-2, "Chui Min Lee" should be changed to --Chul Min Lee--.

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*